United States Patent
Hayashi et al.

(12)

(10) Patent No.: US 6,538,861 B1
(45) Date of Patent: Mar. 25, 2003

(54) MAGNETORESISTIVE HEAD HAVING FERROMAGNETIC TUNNEL JUNCTION FILM WITH A SMALLER RESISTANCE AT A TERMINAL PORTION THAN A CENTRAL PORTION, MAGNETIC RESISTANCE DETECTION SYSTEM WITH THE MAGNETORESISTIVE HEAD AND A MAGNETIC STORAGE SYSTEM USING IT

(75) Inventors: Kazuhiko Hayashi, Tokyo (JP); Masafumi Nakada, Tokyo (JP); Eizo Fukami, Tokyo (JP); Kiyokazu Nagahara, Tokyo (JP); Hiroaki Honjou, Tokyo (JP); Kunihiko Ishihara, Tokyo (JP); Tamaki Toba, Tokyo (JP); Hisanao Tsuge, Tokyo (JP); Atsushi Kamijo, Tokyo (JP)

(73) Assignee: NEC Corporation, Tokyo (JP)

( * ) Notice: Subject to any disclaimer, the term of this patent is extended or adjusted under 35 U.S.C. 154(b) by 4 days.

(21) Appl. No.: 09/597,458

(22) Filed: Jun. 19, 2000

(30) Foreign Application Priority Data

Jun. 17, 1999 (JP) ............................ 11-171661

(51) Int. Cl.$^7$ .............................. G11B 5/39; G11B 5/40
(52) U.S. Cl. ..................... 360/324.2; 360/323
(58) Field of Search ................. 360/128, 232, 360/324.2

(56) References Cited

U.S. PATENT DOCUMENTS

| 5,491,605 A | * 2/1996 | Hughbanks et al. | ........ 360/128 |
| 5,715,121 A | * 2/1998 | Sakakima et al. | ....... 360/324.2 |
| 5,761,009 A | * 6/1998 | Hughbanks et al. | ........ 360/323 |

(List continued on next page.)

FOREIGN PATENT DOCUMENTS

| JP | 4-103014 | 4/1992 |
| JP | 2651015 | 5/1997 |
| JP | 10-162326 | 6/1998 |
| JP | 10-190090 | 7/1998 |
| JP | 11-54814 | 2/1999 |
| JP | 11-68192 | * 3/1999 |

OTHER PUBLICATIONS

Thompson, D.A. et al., "Thin Film Magnetoresistors in Memory, Storage, and Related Applications", in IEEE Transactions on Magnetics, vol. Mag–11, p. 1039, 1975.

*Primary Examiner*—Jefferson Evans
(74) *Attorney, Agent, or Firm*—McGinn & Gibb, PLLC

(57) ABSTRACT

A magnetoresistive head whose operation depends on a magnetoresistive effect is configured using a ferromagnetic tunnel junction (MTJ) film, which is arranged between a lower electrode and an upper electrode. The ferromagnetic tunnel junction film is basically configured using a set of a free layer, a barrier layer and a fixing layer, which are sequentially formed and laminated on the lower electrode. Herein, the ferromagnetic tunnel junction film is designed to avoid electrostatic destruction in manufacture by prescribed measures. For example, the barrier layer is reduced in thickness at a terminal portion as compared with a center portion. Or, the barrier layer has a defect at the terminal portion. In addition, it is possible to provide a conductor in connection with the barrier layer in proximity to its terminal portion. Further, it is possible to attach re-adhesive substance, which is produced by milling for patterning of the ferromagnetic tunnel junction film, to a specific terminal surface of the ferromagnetic tunnel junction film which is opposite to an ABS plane. Those measures provide a bypass allowing overcurrent release between the free layer and fixing layer. Moreover, adjustment milling or plasma oxidation is employed to control an amount of the re-adhesive substance being attached to the terminal surface of the ferromagnetic tunnel junction film. Thus, by adequately optimizing the amount of the re-adhesive substance, it is possible to improve yield in manufacturing the magnetoresistive heads.

33 Claims, 14 Drawing Sheets

U.S. PATENT DOCUMENTS

| | | | | |
|---|---|---|---|---|
| 6,077,618 A | * | 6/2000 | Sakakima et al. | 428/693 |
| 6,160,688 A | * | 12/2000 | Okumura | 360/323 |
| 6,219,206 B1 | * | 4/2001 | Odai et al. | 360/320 |
| 6,281,538 B1 | * | 8/2001 | Slaughter | 257/295 |
| 6,317,302 B1 | * | 11/2001 | Van Kesteren et al. | 360/327.32 |
| 6,327,107 B1 | * | 12/2001 | Komuro et al. | 360/55 |
| 6,333,842 B1 | * | 12/2001 | Nobuyuki et al. | 360/324.2 |
| 6,365,286 B1 | * | 4/2002 | Inomata et al. | 428/692 |

* cited by examiner

1: FORMATION OF LOWER SHIELD, LOWER ELECTRODE, MR FILM

4: FORMATION OF PR

7: BORING OF INSULATION LAYER (TOWARD LOWER ELECTRODE)

2: FORMATION OF STENCIL PR

5: MILLING (UP TO NON-MAGNETIC LAYER) & FORMATION OF INSULATION LAYER

8: FORMATION OF UPPER ELECTRODE, UPPER SHIELD

3: FORMATION OF LONGITUDINAL BIAS, INSULATION FILM & LIFTOFF

6: LIFTOFF

1: FORMATION OF LOWER SHIELD, LOWER ELECTRODE, MR FILM

4: FORMATION OF PR

7: BORING OF INSULATION LAYER (TOWARD LOWER ELECTRODE)

2: FORMATION OF STENCIL PR

5: FORMATION OF UPPER ELECTRODE & LIFTOFF

8: FORMATION OF UPPER SHIELD

3: MILLING (UP TO NON-MAGNETIC LAYER), FORMATION OF INSULATION LAYER & LIFTOFF

6: FORMATION OF PR, FORMATION OF LONGITUDINAL BIAS & LIFTOFF

FIG. 19A

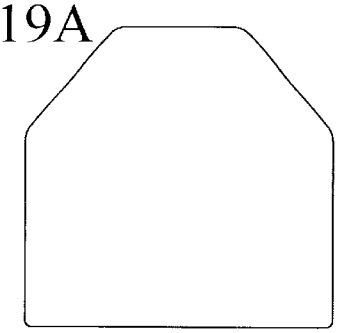

1: FORMATION OF LOWER SHIELD, PATTERNING, FORMATION OF LOWER GAP, FORMATION OF LOWER ELECTRODE

FIG. 19B

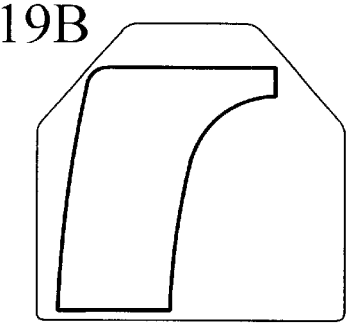

2: LOWER ELECTRODE PR, MILLING, FORMATION OF LONGITUDINAL BIAS

FIG. 19C

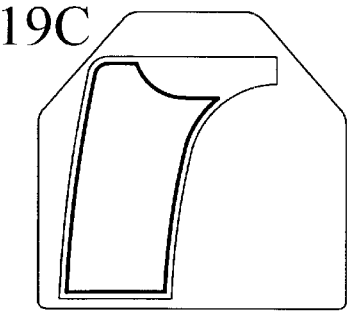

3: LIFTOFF PR FORMATION, FORMATION OF LOWER ELECTRODE THICKENING LAYER, LIFTOFF

FIG. 19D

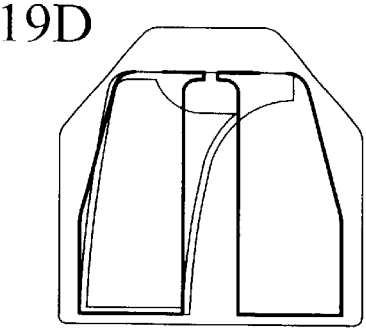

4: PR OF LONGITUDINAL BIAS, MILLING, PR REMOVAL, FORMATION OF TMR FILM, FIRST FORMATION OF UPPER ELECTRODE

FIG. 19E

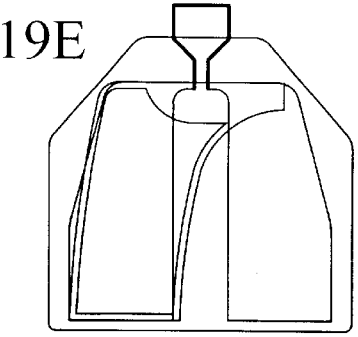

5: PR FORMATION, MILLING, PR REMOVAL, FORMATION OF INSULATION LAYER

FIG. 19F

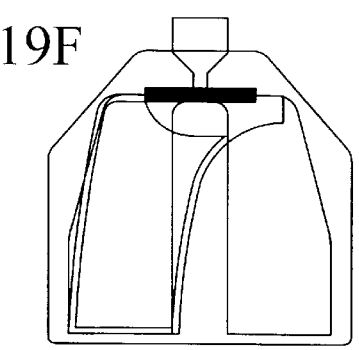

6: PR FORMATION FOR BARRIER LAYER, FREE LAYER, INSULATION LAYER, MILLING, PR REMOVAL

7: LIFTOFF PR FORMATION, SECOND FORMATION OF UPPER ELECTRODE, LIFTOFF

10: FORMATION OF UPPER GAP, BORING OF ELECTRODE, PR MILLING

8: LIFTOFF PR FORMATION, FORMATION OF UPPER ELECTRODE THICKENING LAYER, LIFTOFF

11: PRODUCTION OF RECORDING HEAD, EXPOSURE OF ABS BY LAPPING

9: LIFTOFF PR, FORMATION OF INSULATION THICKENING LAYER, LIFTOFF

MAGNETORESISTIVE HEAD HAVING FERROMAGNETIC TUNNEL JUNCTION FILM WITH A SMALLER RESISTANCE AT A TERMINAL PORTION THAN A CENTRAL PORTION, MAGNETIC RESISTANCE DETECTION SYSTEM WITH THE MAGNETORESISTIVE HEAD AND A MAGNETIC STORAGE SYSTEM USING IT

BACKGROUND OF THE INVENTION

1. Field of the Invention

This invention generally relates to magnetic sensors and transducers that read information and signals recorded on magnetic recording media, and particularly to magnetoresistive heads whose operations depend on magnetoresistive effects. In addition, this invention also relates to magnetic resistance detection systems and magnetic storage systems, which are equipped with the magnetoresistive heads.

This application is based on Patent Application No. Hei 11-171661 filed in Japan, the content of which is incorporated herein by reference.

2. Description of the Related Art

Conventionally, there are provided a variety of magnetic reading heads (or transducers), which are called magnetoresistive (MR) sensors or heads. It is well known that those sensors or heads are capable of reading data on magnetic surfaces of media with great linear densities. Generally speaking, the MR sensors detect magnetic-field signals by using resistance variations, which represent functions regarding intensities and directions of magnetic fluxes being sensed by reading elements. The conventional MR sensor operates based on the anisotropic magnetoresistive (AMR) effect in which one component of resistance of a reading element varies in proportion to the square of the cosine of an angle being formed by a magnetization direction and a direction of a sensing current flowing in the reading element. Detailed explanations for the AMR effects are written on various papers such as the paper entitled "Thin Film Magnetoresistors in Memory, Storage and Related Applications" written by Dr. David A. Thompson and his members and published by IEEE Trans.on Mag. MAG-11, p.1039 on 1975, for example. Generally, the magnetic heads using the AMR effects frequently apply longitudinal bias to reduce Barkhausen noise. In some cases, antiferromagnetic materials such as FeMn, NiMn and nickel oxide are used as materials for application of longitudinal bias.

Recently, several papers report remarkably enhanced magnetoresistive effects, in which resistance variations of laminated magnetic sensors bring spin-dependent transmission of conduction electrons between magnetic layers sandwiching a non-magnetic layer as well as spin-dependent scattering of conduction electrons on accompanying interfaces. Those effects are called by various names such as "giant magnetoresistive effects" or "spin-bubble effects". The magnetoresistive sensors using those effects are made by materials, which are adequately selected. As compared with the general sensors using the AMR effects, those sensors are greatly improved in sensitivity and are accompanied with great variations of resistance. In those magnetoresistive sensors, plane resistance being measured between a pair of ferromagnetic layers, which are separated from each other by a non-magnetic layer, varies in proportion to the cosine of an angle being formed between magnetization directions of the two ferromagnetic layers.

Japanese Unexamined Patent Publication No. Hei 2-61572 (i.e., Japanese Patent No. 2,651,015) discloses a laminated magnetic structure that brings high magnetoresistive variations being caused by anti-parallel alignment of magnetized elements in magnetic layers. As materials applicable to the laminated magnetic structure, the specification of the above patent publication lists transition metals and alloys. It also teaches a structure additionally incorporating a fixing layer, which is fixed to at least one of two ferromagnetic layers being separated by an intermediate layer. In addition, it teaches that a material of FeMn is appropriate for formation of the fixing layer.

Japanese Unexamined Patent Publication No. Hei 4-103014 discloses a ferromagnetic tunnel junction element using multilayer films in which an intermediate layer is inserted into ferromagnetic layers. Herein, it teaches a ferromagnetic tunnel effect film in which bias magnetic field is applied to at least one ferromagnetic layer by an antiferromagnetic substance.

In general, magnetoresistive effect elements of a shield type using ferromagnetic tunnel junction (MTJ) films employ a basic configuration made by three layers, i.e., a free layer, a barrier layer and a fixing layer. Herein, the barrier layer is an insulation layer, while the free layer and fixing layer are metal layers. Such a basic configuration of the free layer, barrier layer and fixing layer substantially acts like a capacitor, so there is a drawback in that electric charges are easily accumulated in the free layer and fixing layer. In other words, electric charges are accumulated in areas between the free layer and fixing layer in a manufacturing process of the magnetoresistive effect element. If a great amount of electric charges are accumulated between them, large voltages are likely applied to both end surfaces of the barrier layer. So, the barrier layer is likely destructed by electric discharge. Resistance variations of the magnetoresistive effect element using the MTJ film are caused by polarization of ferromagnetic substances at both ends of the insulation layer. If insulating destruction is caused so that an electric current bypass is being formed, the magnetoresistive effect element does not produce resistance variations any more.

A magnetic recording/reproduction head using an MTJ film is manufactured by prescribed steps, an outline of which is as follows:

(1) Shield formation.
(2) Lower gap formation.
(3) Lower electrode formation.
(4) MTJ film formation.
(5) Longitudinal bias formation.
(6) Upper electrode formation.
(7) Upper gap formation.
(8) Common pole formation.
(9) Yoke formation.
(10) Coil formation.
(11) Insulator formation.
(12) Upper pole formation.
(13) Terminal formation.
(14) ABS plane lapping.

In the above, photoresist (PR) formation techniques are frequently used for formation of the lower shield, lower gap, lower electrode, MTJ film, longitudinal bias, upper electrode, upper gap, common pole, yoke, coil, insulator and upper pole. Herein, baking operations are performed, such as pre-baking, positive/negative inversion baking and post-baking with regard to photoresists. Those operations are performed in the high-temperature and dry atmosphere, in which static electricity is easily caused to occur. Occurrence of the static electricity after the MTJ film formation causes immediate electrostatic destruction of the barrier layer. In some of the aforementioned steps, milling is performed after formation of the photoresist. However, the milling causes generation of ions, which charge up the (MTJ) free layer and fixing layer. This sometimes causes electrostatic destruction of the barrier layer.

As described above, the barrier layer of the MTJ film is likely destructed by electric charges being caused during manufacturing operations. As a result, the aforementioned manufacturing technique cannot produce magnetoresistive heads well, so there is a problem in that yield in manufacture of magnetoresistive heads is greatly reduced.

SUMMARY OF THE INVENTION

It is an object of the invention to provide a magnetoresistive head that is designed to avoid electrostatic destruction thereof in manufacture.

It is another object of the invention to provide a magnetic resistance detection system and a magnetic storage system, each of which is equipped with the magnetoresistive head.

A magnetoresistive head whose operation depends on a magnetoresistive effect is configured using a ferromagnetic tunnel junction (MTJ) film, which is arranged between a lower electrode and an upper electrode. The ferromagnetic tunnel junction film is basically configured using a set of a free layer, a barrier layer and a fixing layer, which are sequentially formed and laminated on the lower electrode. Longitudinal bias layers and insulation layers are arranged on both sides of the ferromagnetic tunnel junction film.

This invention is characterized by that the ferromagnetic tunnel junction film is designed to avoid electrostatic destruction in manufacture by prescribed measures. For example, the barrier layer is reduced in thickness at a terminal portion as compared with a center portion. Or, the barrier layer has a defect at the terminal portion. In addition, it is possible to provide a conductor in connection with the barrier layer in proximity to its terminal portion. Further, it is possible to attach re-adhesive substance, which is produced by milling for patterning of the ferromagnetic tunnel junction film, to a specific terminal surface of the ferromagnetic tunnel junction film which is opposite to an ABS plane. Those measures provide a bypass allowing overcurrent release between the free layer and fixing layer. Moreover, adjustment milling or plasma oxidation is employed to control an amount of the re-adhesive substance being attached to the terminal surface of the ferromagnetic tunnel junction film. Thus, by adequately optimizing the amount of the re-adhesive substance, it is possible to improve yield in manufacturing the magnetoresistive heads.

In addition, it is possible to propose a magnetic resistance detection system and a magnetic storage system using the aforementioned magnetoresistive head. For example, a magnetic disk device installs magnetic disks, on which data are recorded or reproduced by the magnetoresistive heads.

BRIEF DESCRIPTION OF THE DRAWINGS

These and other objects, aspects and embodiments of the present invention will be described in more detail with reference to the following drawing figures, of which:

FIG. 19A shows step 1 in manufacture of a head having the structure of FIG. 1 in accordance with a special technique of this invention;

FIG. 19B shows step 2 in manufacture of the head;

FIG. 19C shows step 3 in manufacture of the head;

FIG. 19D shows step 4 in manufacture of the head;

FIG. 19E shows step 5 in manufacture of the head;

FIG. 19F shows step 6 in manufacture of the head;

DESCRIPTION OF THE PREFERRED EMBODIMENTS

This invention will be described in further detail by way of examples with reference to the accompanying drawings.

Figure 1:
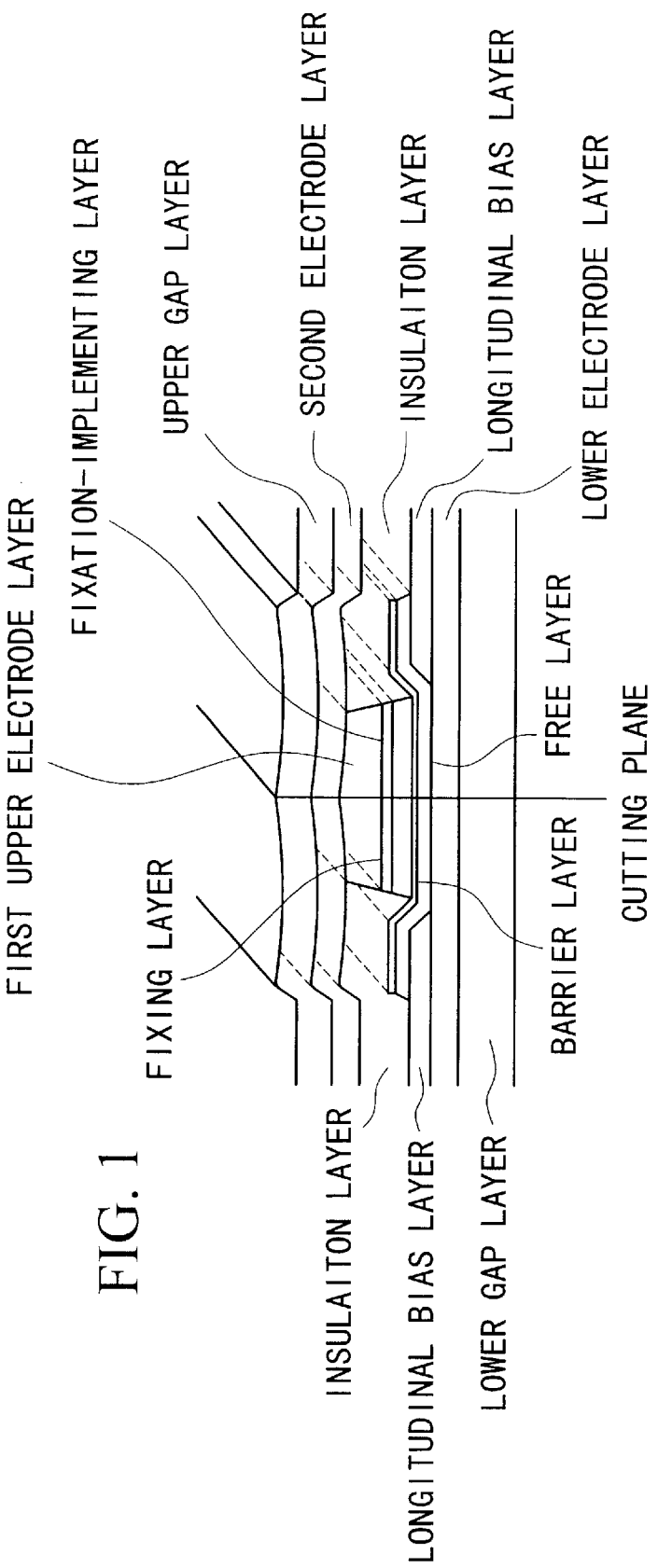
FIG. 1 is a sectional view showing an example of a head reproduction portion of a magnetoresistive head in structure, which is taken using a cutting plane parallel to an ABS plane.

FIG. 1 is a sectional view that shows an example of a reproduction head portion of a magnetoresistive head as an application of this invention. Herein, illustration of FIG. 1 is given using a cutting plane which is parallel to an ABS plane and by which the reproduction portion of the magnetoresistive head is being cut. The illustration is somewhat simplified by omitting details of construction, wherein a lower shield is formed on a base material. The lower shield is appropriately shaped in a prescribed pattern. A lower gap layer (which is a lowermost part shown in FIG. 1) is formed on the lower shield. In addition, a lower electrode layer is formed on the lower gap layer and is appropriately shaped in a prescribed pattern. Further, a free layer and a barrier layer are sequentially formed and laminated on the lower electrode layer. A set of a fixing layer, a fixation-implementing layer and a first upper electrode layer are sequentially formed and laminated in an area that exists between left and right longitudinal bias layers on the barrier layer. Those layers are appropriately shaped in a prescribed pattern. Incidentally, it is possible to exclude the first upper electrode layer. Insulation layers are respectively arranged at left and right sides of the prescribed pattern of the fixing layer, fixation-implementing layer and first upper electrode layer. A second upper electrode layer and an upper gap layer are sequentially formed and laminated on the aforementioned layers. The second upper electrode layer is appropriately shaped in a prescribed pattern. The illustration of FIG. 1 excludes an upper shield and a recording head portion, which are sequentially formed on the upper gap layer (which is an uppermost part of FIG. 1). A set of the free layer, barrier layer, fixing layer and fixation-implementing layer correspond to a ferromagnetic tunnel junction film. In the aforementioned structure of the head, an electric current flows downwardly from the upper electrode to the lower electrode, for example. In that case, the electric current flows from the second upper electrode layer to sequentially pass through the first upper electrode layer, fixation-implementing layer, fixing layer, barrier layer and free layer, then, it reaches the lower electrode layer. Herein, the longitudinal bias layers are not at all concerned with flow of the electric current. In addition, the longitudinal bias layers are directly formed on the free layer in a laminated manner. That is, longitudinal bias is sufficiently applied to the free layer. Therefore, the aforementioned structure of the head guarantees precise flow of a sense current in the ferromagnetic tunnel junction film and precise application of the longitudinal bias to the free layer.

The lower gap layer and upper gap layer are not necessarily needed for the head of FIG. 1. That is, it is possible to exclude those layers. In that case, the lower electrode layer is formed directly on the lower shield such that at least a part of the lower electrode layer is brought into contact with the lower shield, while the upper shield is directly formed on the upper electrode layer such that at least a part of the upper electrode layer is brought into contact with the upper shield. In addition, it is possible to form a lower layer which is placed beneath the free layer and in contact with the free layer. Further, it is possible to form an upper layer which is placed on and in contact with an antiferromagnetic layer.

Figure 2:
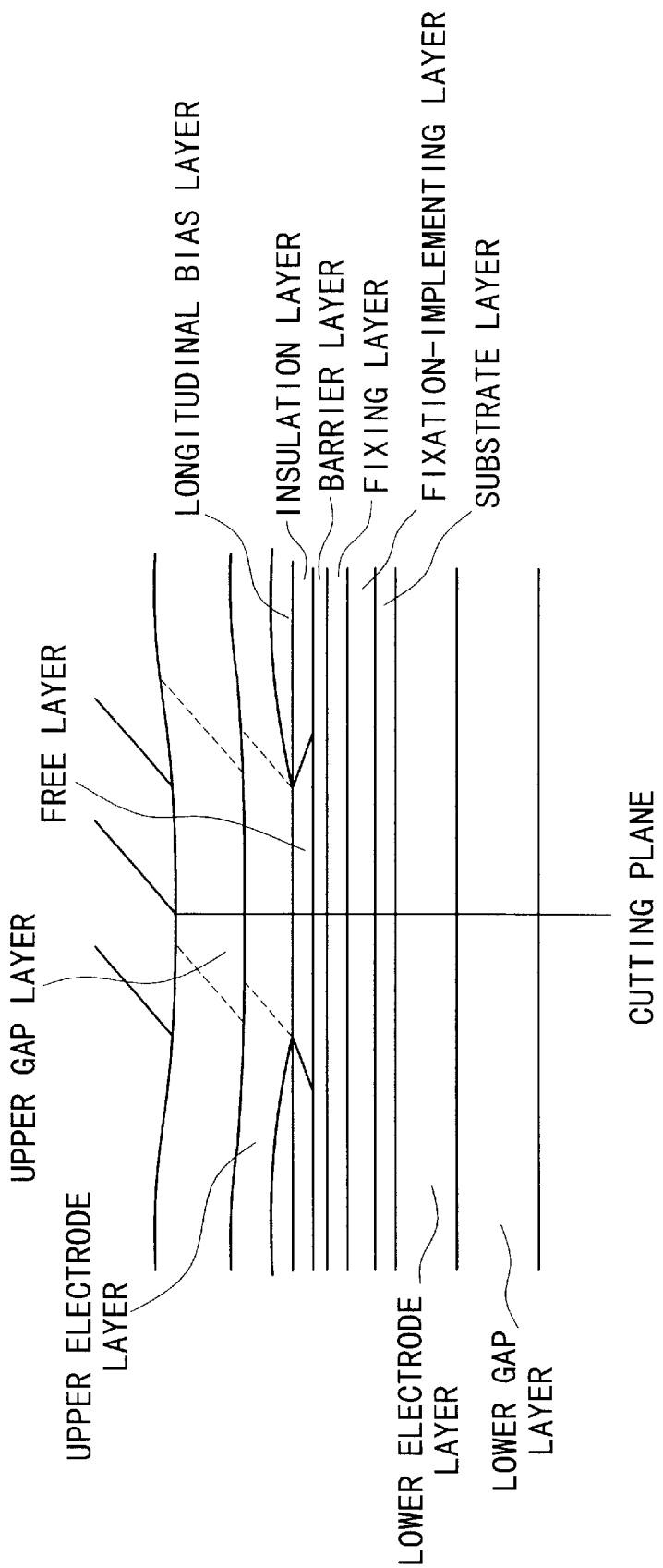
FIG. 2 is a sectional view showing another example of a head reproduction portion of a magnetoresistive head in structure, which is taken using a cutting plane parallel to an ABS plane.

FIG. 2 is a sectional view that shows an example of a head reproduction portion of a magnetoresistive head as an application of this invention. Illustration of FIG. 2 is given using a cutting plane, which is parallel to an ABS plane and by which the head reproduction portion is being cut. Herein, a lower shield layer is formed on a base and is appropriately shaped in a prescribed pattern. A lower electrode layer is formed on the lower shield and is appropriately shaped in a prescribed pattern. Then, an antiferromagnetic layer, a fixing layer and a barrier layer are sequentially formed and laminated on the lower electrode layer. The illustration of FIG. 2 does not show detailed configurations, wherein the antiferromagnetic layer, fixing layer and barrier layer are appropriately shaped in a prescribed pattern. Two pairs of layers such as insulation layers and longitudinal bias layers are respectively arranged on left and right sides of the free layer. Herein, ends of the paired layers are respectively brought into contact with left and right ends of the free layer. An upper electrode layer is formed on the aforementioned layers and is appropriately shaped in a prescribed pattern.

An upper gap layer and an upper shield layer are sequentially formed and laminated on the upper electrode layer. Herein, the upper shield layer is shaped in a prescribed pattern. Incidentally, a set of a fixation-implementing layer, a fixing layer, a barrier layer and a free layer correspond to a ferromagnetic tunnel junction film. In the aforementioned structure of the head shown in FIG. 2, an electric current flows downwardly from the upper electrode to the lower electrode, for example. In that case, the electric current flows from the upper electrode to sequentially pass through the free layer, barrier layer, fixing layer and fixation-implementing layer, then, it reaches the lower electrode. Due to the insulation layers and the barrier layer, the longitudinal bias layers are electrically insulated from several layers which are arranged under the fixing layer. So, the longitudinal bias layers are not at all concerned with flow of the electric current. In addition, the longitudinal bias layers are brought into contact with the free layer. So, longitudinal bias is sufficiently applied to the free layer. Therefore, the aforementioned structure of FIG. 2 guarantees precise flow of a sense current in the ferromagnetic tunnel junction film and precise application of the longitudinal bias to the free layer.

Incidentally, it is possible to exclude the lower gap layer and upper gap layer from the aforementioned structure of FIG. 2. In that case, the lower electrode layer is directly formed on the lower shield layer such that at least a part of the lower electrode layer is brought into contact with the lower shield layer. In addition, the upper shield layer is formed directly on the upper electrode layer such that at least a part of the upper electrode layer is brought into contact with the upper shield layer. Further, it is possible to form a lower layer which is placed beneath and in contact with the free layer. Furthermore, it is possible to form an upper layer which is placed on and in contact with the antiferromagnetic layer. The example of FIG. 2 merely shows that only the free layer is shaped in a prescribed pattern within the layers of the ferromagnetic tunnel junction film. Because, it is required that at least the free layer is shaped in the prescribed pattern. In other words, it is possible to adequately determine whether to shape each of other layers in a prescribed pattern. If some oxide materials are used for the longitudinal bias layers, it is possible to exclude the insulation layers, which are arranged beneath the longitudinal bias layers, because the oxide materials themselves act as insulating materials.

Next, a description will be given with respect to other cutting sections of the aforementioned head portions shown in FIGS. 1 and 2, which are made using cutting planes perpendicular to the ABS planes. Structures of those cutting sections are similar to those shown in FIGS. 1 and 2. That is, a lower shield is formed on a base material and is appropriately shaped in a prescribed pattern. A lower gap and a lower electrode are sequentially formed on the lower shield layer. Herein, the lower electrode is shaped in a prescribed pattern. An MTJ element and a first electrode are sequentially formed in an area approaching the ABS plane on the lower electrode. Insulation layers are formed in other areas on the lower electrode. Incidentally, it is possible to exclude the first upper electrode. An insulation thickening layer is formed in a selected area, which is arranged in an opposite side of the ABS plane in connection with the MTJ element and first upper electrode. If insulation is sufficiently secured between the upper electrode and lower electrode, it is possible not to use the insulation thickening layer. A second electrode is arranged in contact with the first electrode in the side of the ABS plane. FIGS. 1 and 2 show that the second electrode is formed and arranged to partly ride on the insulation thickening layer. However, the second electrode is not necessarily formed and arranged in such a manner. Then, an upper gap and an upper shield are sequentially formed on the aforementioned layers. The upper shield is appropriately shaped in a prescribed pattern. The above description is made such that all of the layers of the ferromagnetic tunnel junction film are shaped in a prescribed pattern. Of course, all the layers are not necessarily shaped in the prescribed pattern. So, it is possible to adequately determine whether to shape each of the layers of the ferromagnetic tunnel junction film in a prescribed pattern. If patterning is stopped without being completed, some parts of the ferromagnetic tunnel junction film remain beneath the insulation layer(s).

Figure 3:
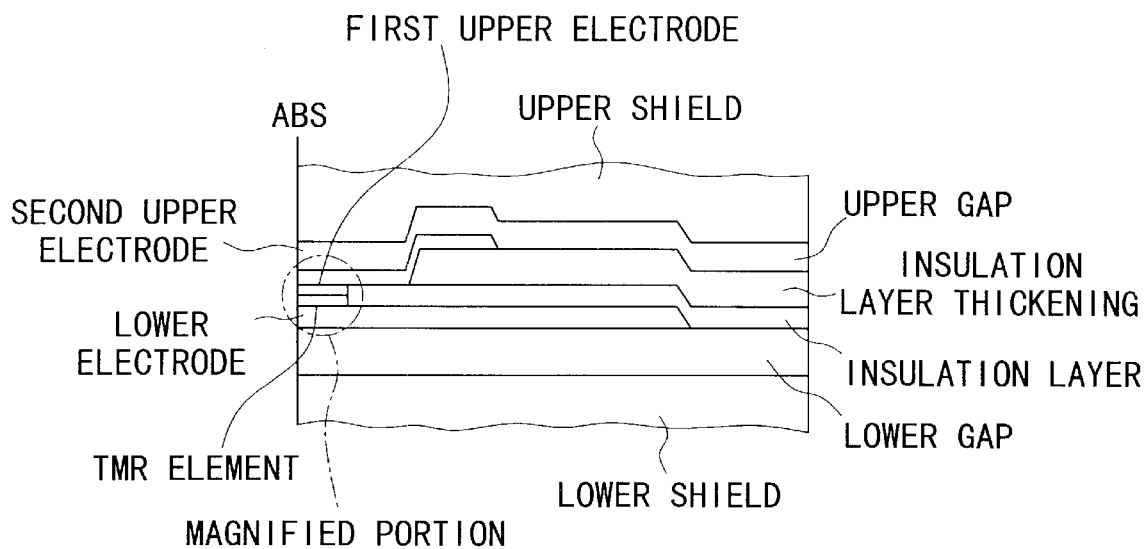
FIG. 3 is a sectional view showing a structure of the magnetoresistive head of FIG. 1, which is taken using a cutting plane perpendicular to the ABS plane.
Figure 4:
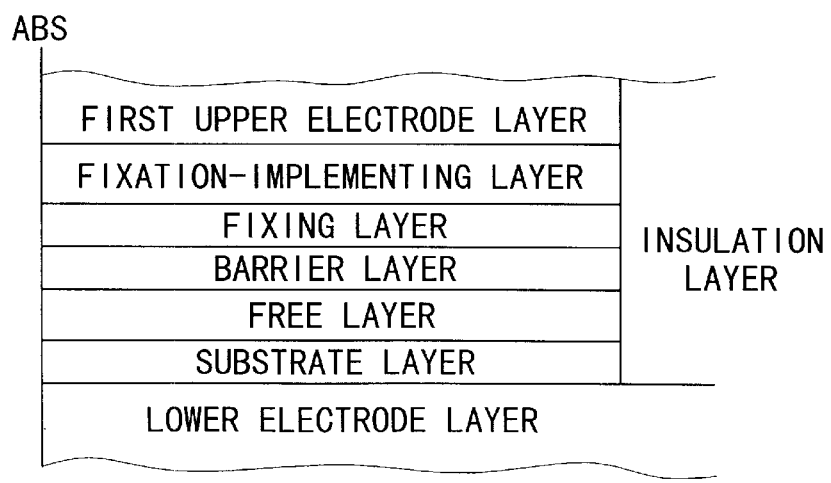
FIG. 4 is an enlarged sectional view showing an example of a structure for a selected part being magnified in FIG. 3.

FIG. 3 is a simplified illustration showing a basic configuration of the head, wherein a selected part encompassed by a circle is magnified and is shown in FIG. 4. An illustration of FIG. 4 basically corresponds to the illustration of FIG. 1 in structure, which is different from the illustration of FIG. 2. In FIG. 4, a substrate layer, a free layer, a barrier layer, a fixing layer, a fixation-implementing layer and a first upper electrode layer are sequentially formed and laminated on a lower electrode layer. FIG. 4 shows that in an opposite side of an ABS plane, all of the substrate layer, free layer, barrier layer, fixing layer, fixation-implementing layer and first upper electrode layer are shaped in prescribed patterns respectively. However, all of those layers are not necessarily shaped in the prescribed patterns. Because, it is required that at least the fixing layer, fixation-implementing layer and first upper electrode layer are shaped in prescribed patterns respectively. So, it is possible to adequately determine whether to shape each of other layers in a prescribed pattern. In addition, it is possible to exclude the substrate layer and first upper electrode layer. Further, it is possible to form an upper layer on the fixation-implementing layer instead of the first upper electrode layer.

Figure 5:
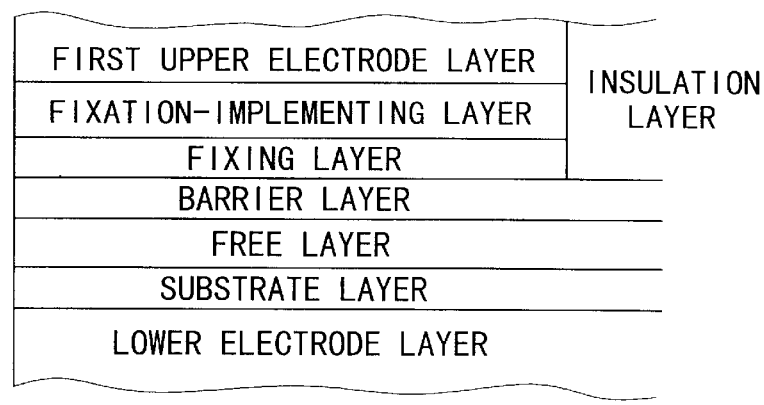
FIG. 5 is an enlarged sectional view showing another example of a structure for the selected part being magnified in FIG. 3.

FIG. 5 shows another example of the selected part being magnified in FIG. 3. Illustration of FIG. 5 basically corresponds to the illustration of FIG. 1. In FIG. 5, a substrate layer, a free layer, a barrier layer, a fixing layer, a fixation-implementing layer and a first upper electrode layer are sequentially formed and laminated on a lower electrode layer. FIG. 5 shows that in an opposite side of an ABS plane, the fixing layer, fixation-implementing layer and first upper electrode layer are shaped in prescribed patterns respectively. As described before, it is required that at least the fixing layer, fixation-implementing layer and first upper electrode layer are shaped in the prescribed patterns. Hence, it is possible to adequately determine whether to shape each of other layers in a prescribed shape. Incidentally, it is possible to exclude the substrate layer and first upper electrode layer. So, it is possible to form an upper layer on the fixation-implementing layer instead of the first upper electrode layer.

Figure 6:
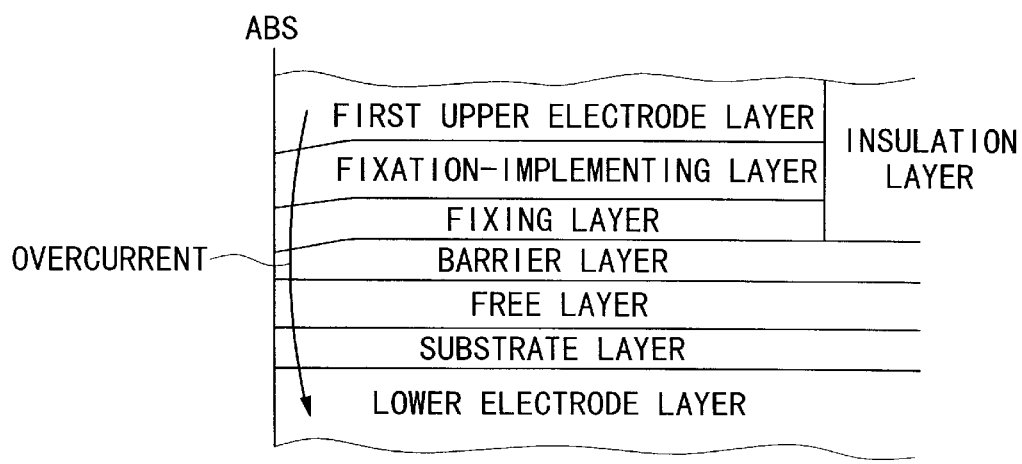
FIG. 6 is a sectional view diagrammatically showing a basic configuration of a magnetoresistive head in structure in accordance with this invention, which is taken using a cutting plane perpendicular to an ABS plane.

FIG. 6 is a sectional view showing a basic configuration of a magnetoresistive head in structure in accordance with this invention. Herein, a substrate layer, a free layer, a barrier layer, a fixing layer, a fixation-implementing layer and a first upper electrode layer are sequentially formed and laminated on a lower electrode layer. In addition, the fixing layer, fixation-implementing layer and first upper electrode layer are shaped in prescribed patterns and are arranged in connection with an insulation layer.

Figure 7:
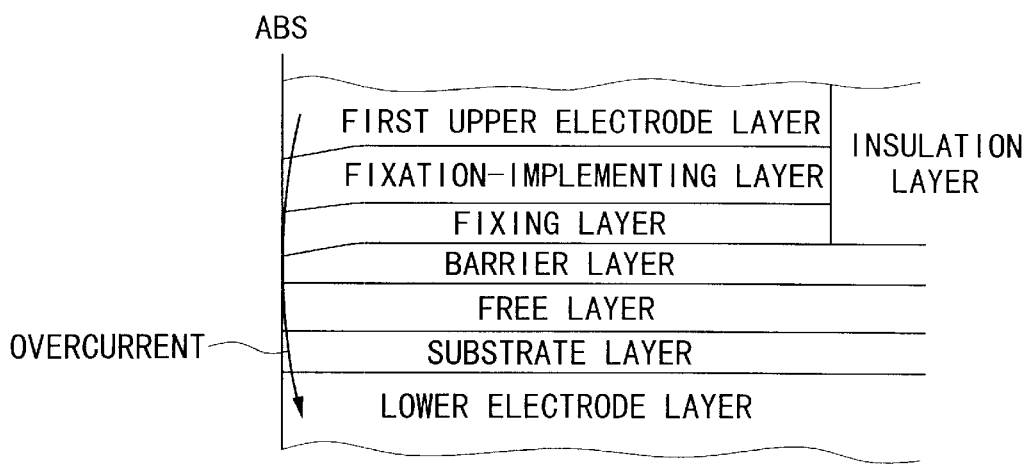
FIG. 7 is a sectional view showing a first example of the structure for the magnetoresistive head of FIG. 6 in which a barrier layer is reduced in thickness in proximity to the ABS plane.

FIG. 7 is a sectional view showing a first example of the structure for the magnetoresistive head of FIG. 6, which is cut using a cutting plane perpendicular to an ABS plane. This example is characterized by that the barrier layer is reduced in thickness at a selected part thereof in proximity to the ABS plane. Thus, when voltage applied between the free layer and fixing layer exceeds a certain threshold, electric discharge is caused to occur between the free layer and fixing layer in proximity to a tip end portion of the barrier layer. Generally, such a tip end portion of the barrier layer is frequently damaged by a lapping step in manufacture. So, the magnetoresistive head is not deteriorated in properties so much even if the tip end portion of the barrier layer is further damaged by small electric discharge. Incidentally, the barrier layer is not necessarily reduced in thickness such that thickness thereof is uniformly reduced in proximity to the ABS plane. That is, the barrier layer can be formed such that it is partially reduced in thickness. It is necessary to establish a condition where electric conductivity being measured between the free layer and fixing layer sandwiching a thin portion of the barrier layer is sufficiently reduced as compared with electric conductivity measured between the free layer and fixing layer sandwiching a normal portion of the barrier layer. Therefore, the free layer and fixing layer can be arranged adjacent to each other to be directly in contact with each other as long as the aforementioned condition is satisfied.

Figure 8:
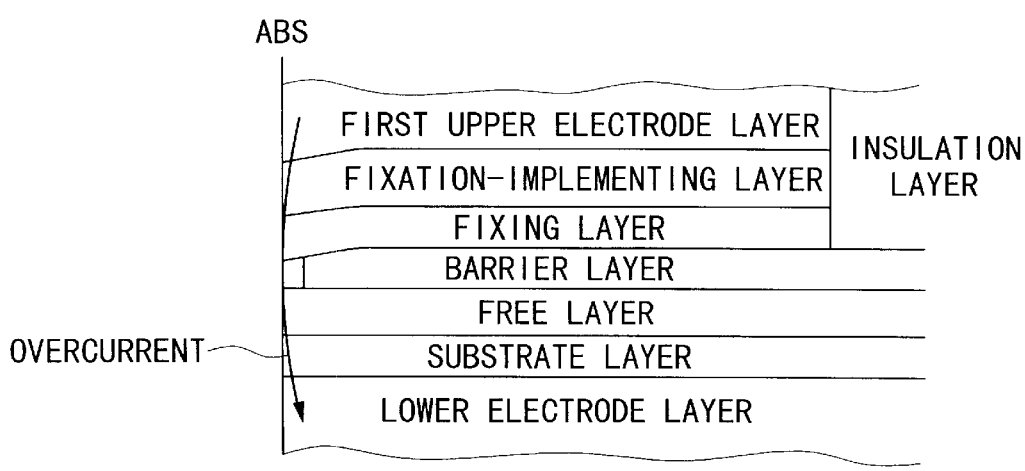
FIG. 8 is a sectional view showing a second example of the structure for the magnetoresistive head of FIG. 6 in which the barrier layer has a defect in proximity to the ABS plane.

FIG. 8 is a sectional view showing a second example of the structure for the magnetoresistive head of FIG. 6, which is cut using a cutting plane perpendicular to the ABS plane. The second example is characterized by that the barrier layer has a defect (or defects) which is arranged in proximity to the ABS plane. Therefore, an interval of distance between the free layer and fixing layer is narrowed with respect to such a "defective" tip end portion of the barrier layer. Thus, when voltage applied between the free layer and fixing layer exceeds a certain threshold, electric discharge is caused to occur between the free layer and fixing layer in proximity to the defective tip end portion of the barrier layer. Normally, the barrier layer is not necessarily extended to an area corresponding to the defect. So, even if the barrier layer has the defect in such an area so that the barrier layer is damaged by small electric discharge, the magnetoresistive head is not deteriorated in properties so much. Incidentally, the interval of distance between the free layer and fixing layer is not necessarily uniformly reduced in response to the defect of the barrier layer in proximity to the ABS plane. That is, the barrier layer can be partially reduced in thickness in proximity to the ABS plane. For this reason, it is necessary to establish a condition where electric conductivity being measured between the free layer and fixing layer in proximity to the defect of the barrier layer is sufficiently reduced as compared with electric conductivity measured between the free layer and fixing layer sandwiching a normal portion of the barrier layer. So, the free layer and fixing layer can be arranged adjacent to each other to be directly in contact with each other as long as the aforementioned condition is satisfied.

Figure 9:
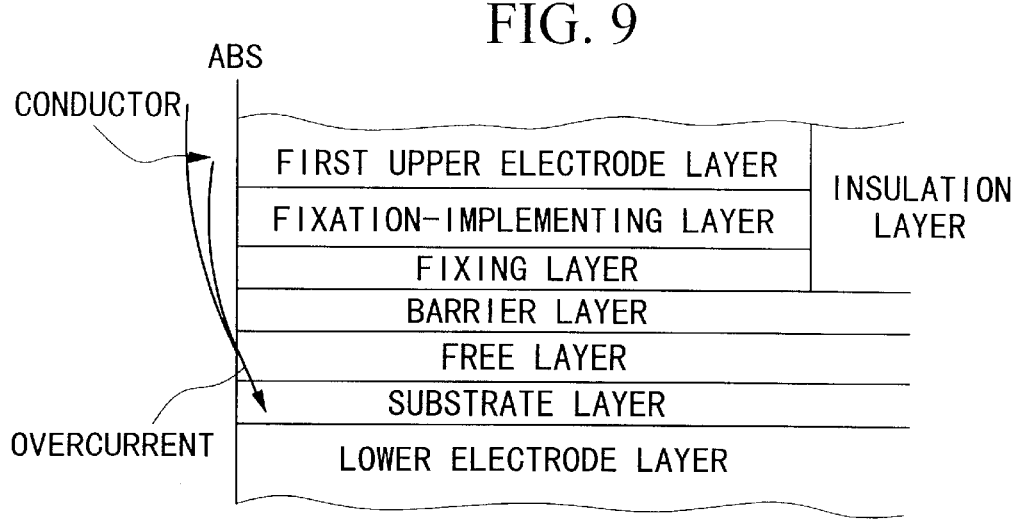
FIG. 9 is a sectional view showing a third example of the structure for the magnetoresistive head of FIG. 6 which is equipped with a conductor in connection with the barrier layer along the ABS plane.

FIG. 9 is a sectional view showing a third example of the structure for the magnetoresistive head of FIG. 6, which is cut using a cutting plane perpendicular to the ABS plane. This example is characterized by providing a conductor, which is arranged outside of the ABS plane. Herein, the conductor is arranged to be electrically in contact with the fixing layer but is insulated from the free layer. In addition, a tip end portion of the conductor is connected or attached to the barrier layer such that an interval of distance between the conductor and free layer is smaller than an interval of distance between the free layer and fixing layer in proximity to the ABS plane. Thus, when a potential difference between the free layer and fixing layer exceeds a certain threshold, electric discharge is caused to occur between the free layer and the tip end portion of the conductor. Normally, the barrier layer is not extended to an area corresponding to the tip end portion of the conductor. So, even if electric discharge is caused to occur between them, it is irrelevant to an output of the magnetoresistive head, so the magnetoresistive head is not deteriorated in properties so much. Incidentally, an interval of distance being measured between the free layer and tip end portion of the conductor is not necessarily varied uniformly in proximity to the ABS plane. That is, it can be partially reduced at a selected position. It is necessary to establish a condition where electric conductivity being measured between the free layer and the tip end portion of the conductor is sufficiently smaller than electric conductivity measured between the free layer and fixing layer sandwiching a normal portion of the barrier layer. Therefore, the free layer and the tip end portion of the conductor can be arranged to be directly in contact with each other as long as the aforementioned condition is satisfied.

Figure 10:
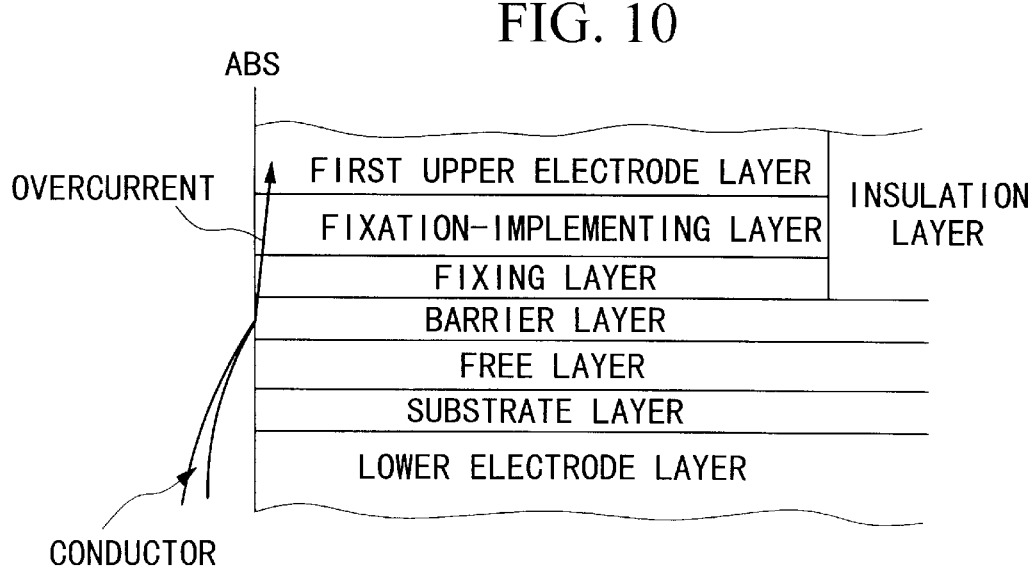
FIG. 10 is a sectional view showing a fourth example of the structure for the magnetoresistive head of FIG. 6 which is equipped with a conductor in connection with the barrier layer along the ABS plane.

FIG. 10 is a sectional view showing a fourth example of the structure for the magnetoresistive head of FIG. 6, which is cut using a cutting plane perpendicular to the ABS plane. The fourth example is characterized by providing a conductor which is placed outside of the ABS plane. Herein, the conductor is arranged to be electrically in contact with the free layer but is insulated from the fixing layer. In addition, a tip end portion of the conductor is connected or attached to the barrier layer such that an interval of distance between the conductor and fixing layer is smaller than an interval of distance between the free layer and fixing layer in proximity to the ABS plane. Thus, when a potential difference between the free layer and fixing layer exceeds a certain threshold, electric discharge is caused to occur between the fixing layer and the tip end portion of the conductor. Normally, the barrier layer is not extended to an area corresponding to the tip end portion of the conductor. Hence, even if the electric discharge is caused to occur in such an area, the head is not deteriorated in properties so much. Incidentally, the interval of distance between the fixing layer and the tip end portion of the conductor is not necessarily varied uniformly in proximity to the ABS plane. That is, it can be partially reduced at a selected position. It is necessary to establish a condition where electric conductivity being measured between the fixing layer and the tip end portion of the conductor is sufficiently smaller than electric conductivity measured between the free layer and fixing layer sandwiching a normal portion of the barrier layer. Therefore, the tip end portion of the conductor can be arranged to be directly in contact with the fixing portion as long as the aforementioned condition is satisfied.

Figure 11:
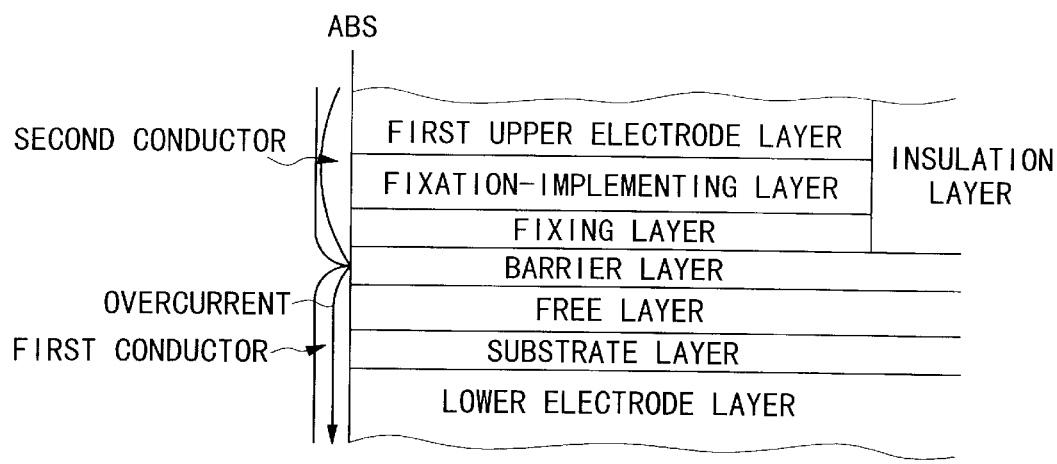
FIG. 11 is a sectional view showing a fifth example of the structure for the magnetoresistive head of FIG. 6 which is equipped with conductors in connection with the barrier layer along the ABS plane.

FIG. 11 is a sectional view showing a fifth example of the structure for the magnetoresistive head of FIG. 6, which is cut using a cutting plane perpendicular to the ABS plane. This example is characterized by providing first and second conductors which are placed outside of the ABS plane. That is, the first conductor is arranged to be electrically in contact with the free layer but is insulated from the fixing layer, while the second conductor is arranged to be electrically in contact with the fixing layer but is insulated from the free layer. In addition, tip end portions of the conductors are connected or attached to the barrier layer such that an interval of distance between the first and second conductors is smaller than an interval of distance between the free layer and fixing layer in proximity to the ABS plane. Thus, when a potential difference between the free layer and fixing layer exceeds a certain threshold, electric discharge is caused to occur between the tip end portions of the conductors. Normally, the barrier layer is not extended to an area corresponding to the tip end portions of the conductors. Hence, such an area is irrelevant to an output of the head. So, even if the electric discharge occurs in such an area, the head is not deteriorated in properties so much. Incidentally, the interval of distance between the tip end portions of the conductors is not necessarily varied uniformly in proximity to the ABS plane. That is, it can be partially reduced at a selected position. It is necessary to establish a condition where electric conductivity being measured between the tip end portions of the conductors is sufficiently smaller than electric conductivity measured between the free layer and fixing layer sandwiching a normal portion of the barrier layer. Therefore, the tip end portions of the conductors can be brought into contact with each other as long as the aforementioned condition is satisfied.

Figure 12:
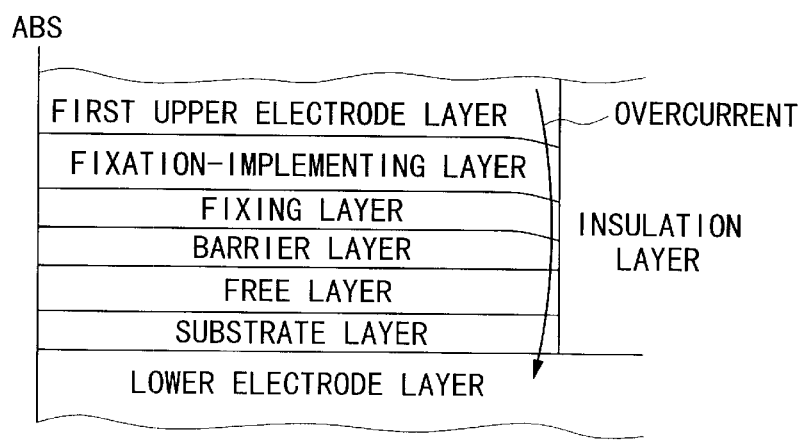
FIG. 12 is a sectional view showing a sixth example of the structure for the magnetoresistive head of FIG. 6 in which the barrier layer is reduced in thickness in proximity to a terminal surface opposite to the ABS plane.

FIG. 12 is a sectional view showing a sixth example of the structure for the magnetoresistive head of FIG. 6, which is cut using a cutting plane perpendicular to the ABS plane. This example is characterized by that the barrier layer is reduced in thickness in proximity to a terminal surface, which is an opposite side of the ABS plane. Thus, when voltage applied between the free layer and fixing layer exceeds a certain threshold, electric discharge is caused to occur between the free layer and fixing layer in proximity to an end portion of the barrier layer which is reduced in thickness. Normally, a leakage magnetic field from a medium hardly influences an area corresponding to the end portion of the barrier layer. So, even if the head is damaged by small electric discharge that occurs in such an area, the head is not deteriorated in properties so much. Incidentally, the end portion of the barrier layer is not necessarily reduced in thickness uniformly in proximity to the terminal surface which is opposite to the ABS plane. That is, the end portion of the barrier layer can be partially reduced in thickness. It is necessary to establish a condition where electric conductivity being measured between the free layer and fixing layer sandwiching the end portion of the barrier layer is sufficiently smaller than electric conductivity measured between the free layer and fixing layer sandwiching a normal portion of the barrier layer. Therefore, the free layer and fixing layer can be arranged adjacent to each other to be directly in contact with each other as long as the aforementioned condition is satisfied.

Figure 13:
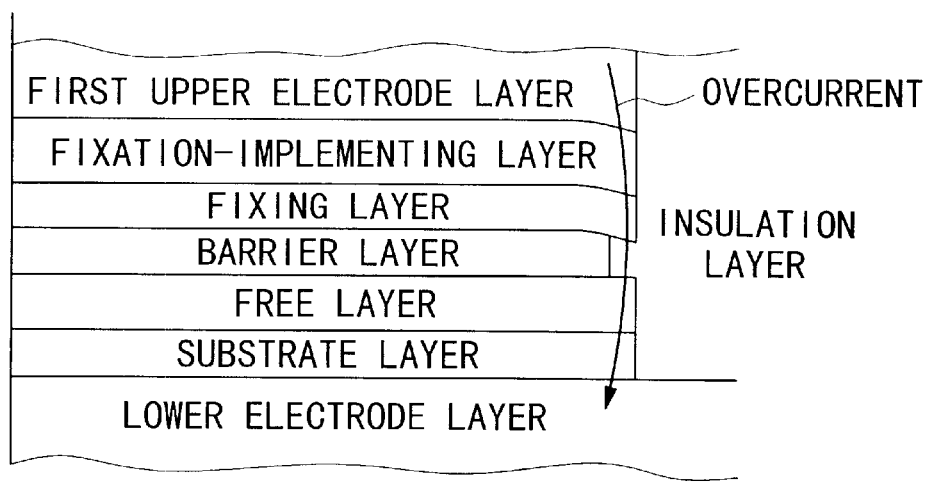
FIG. 13 is a sectional view showing a seventh example of the structure for the magnetoresistive head of FIG. 6 in which the barrier layer has a defect in proximity to the terminal surface opposite to the ABS plane.

FIG. 13 is a sectional view showing a seventh example of the structure for the magnetoresistive head of FIG. 6, which is cut using a cutting plane perpendicular to the ABS plane. This example is characterized by that the barrier layer has a defect (or defects) in proximity to the terminal surface which is opposite to the ABS plane. Hence, an interval of distance between the free layer and fixing layer is reduced in an area corresponding to the defect of the barrier layer. Thus, when voltage applied between the free layer and fixing layer exceeds a certain threshold, electric discharge is caused to occur between the free layer and fixing layer in proximity to the area at which the interval of distance therebetween is reduced due to the defect of the barrier layer. Normally, the barrier layer is not extended to such an area, so that the barrier layer is not damaged so much due to small electric discharge that occurs in the area. Therefore, even if the small electric discharge occurs, the head is not deteriorated in properties so much. Incidentally, the interval of distance between the free layer and fixing layer is not necessarily reduced uniformly in proximity to the terminal surface which is opposite to the ABS plane. That is, it can be partially reduced at a selected position. It is necessary to establish a condition where electric conductivity being measured between the free layer and fixing layer sandwiching the defect of the barrier layer is sufficiently smaller than electric conductivity measured between the free layer and fixing layer sandwiching a normal portion of the barrier layer. Thus, the free layer and fixing layer can be arranged adjacent to each other to be directly in contact with each other as long as the aforementioned condition is satisfied.

Figure 14:
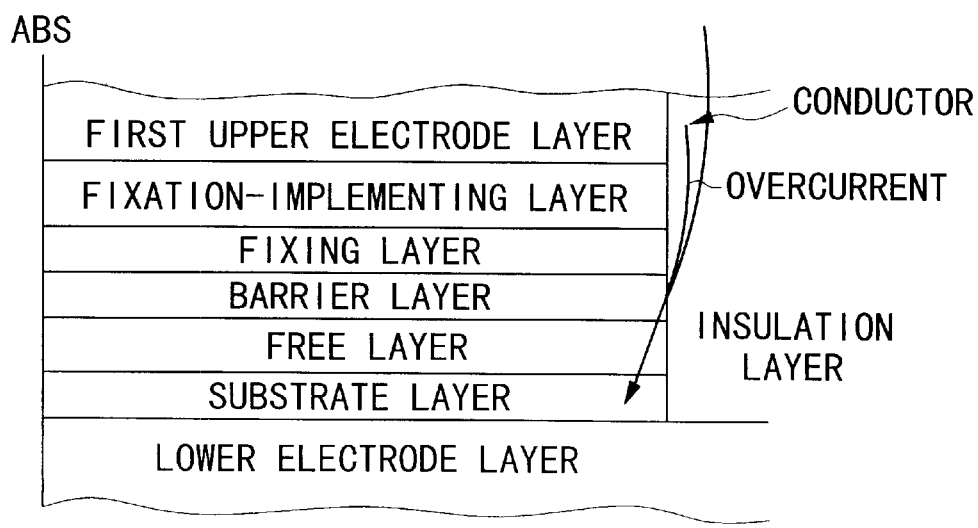
FIG. 14 is a sectional view showing an eighth example of the structure for the magnetoresistive head of FIG. 6 which is equipped with a conductor in connection with the barrier layer along the terminal surface.

FIG. 14 is a sectional view showing an eighth example of the structure for the magnetoresistive head of FIG. 6, which is cut using a cutting plane perpendicular to the ABS plane. This example is characterized by providing a conductor which is placed outside of the terminal surface being opposite to the ABS plane. The conductor is arranged to be electrically in contact with the fixing layer but is insulated from the free layer. In addition, a tip end portion of the conductor is connected or attached to the barrier layer such that an interval of distance between the conductor and free layer is smaller than an interval of distance between the free layer and fixing layer. Thus, when a potential difference between the free layer and fixing layer exceeds a certain threshold, electric discharge is caused to occur between the free layer and the tip end portion of the conductor. Normally, the barrier layer is not extended to an area corresponding to the tip end portion of the conductor, so that such an area is irrelevant to an output of the head. Hence, even if the electric discharge occurs in such an area, the head is not deteriorated in properties so much. Incidentally, an interval of distance between the free layer and the tip end portion of the conductor is not necessarily varied uniformly in proximity to the terminal surface opposite to the ABS plane. That is, it can be partially reduced at a selected position. So, it is necessary to establish a condition where electric conductivity being measured between the free layer and the tip end portion of the conductor is sufficiently smaller than electic conductivity measured between the free layer and fixing layer sandwiching a normal portion of the barrier layer. Thus, the tip end portion of the conductor can be arranged to be directly in contact with the free layer as long as the aforementioned condition is satisfied.

Figure 15:
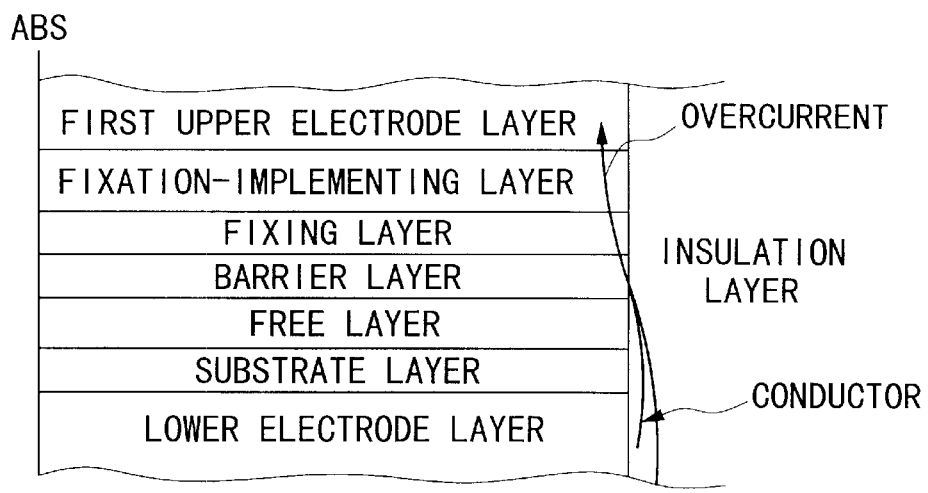
FIG. 15 is a sectional view showing a ninth example of the structure for the magnetoresistive head of FIG. 6 which is equipped with a conductor in connection with the barrier along the terminal surface.

FIG. 15 is a sectional view showing a ninth example of the structure for the magnetoresistive head of FIG. 6, which is cut using a cutting plane perpendicular to the ABS plane. This example is characterized by providing a conductor which is placed outside of the terminal surface opposite to the ABS plane. The conductor is arranged to be electrically in contact with the free layer but is insulated from the fixing layer. In addition, a tip end portion of the conductor is connected or attached to the barrier layer such that an interval of distance between the fixing layer and conductor is smaller than an interval of distance between the free layer and fixing layer. Thus, when a potential difference between the free layer and fixing layer exceeds a certain threshold, electric discharge is caused to occur between the fixing layer and the tip end portion of the conductor. Normally, the barrier layer is not extended to an area corresponding to the tip end portion of the conductor, so that such an area is irrelevant to an output of the head. So, even if the electric discharge occurs in such an area, the head is not deteriorated in properties so much. Incidentally, an interval of distance between the fixing layer and the tip end portion of the conductor is not necessarily varied uniformly in proximity to the terminal surface opposite to the ABS plane. That is, it can be partially reduced at a selected position. It is necessary to establish a condition where electric conductivity being measured between the fixing layer and the tip end portion of the conductor is sufficiently smaller than electric conductivity measured between the free layer and fixing layer sandwiching a normal portion of the barrier. Therefore, the tip end portion of the conductor can be arranged to be directly in contact with the fixing layer as long as the aforementioned condition is satisfied.

Figure 16:
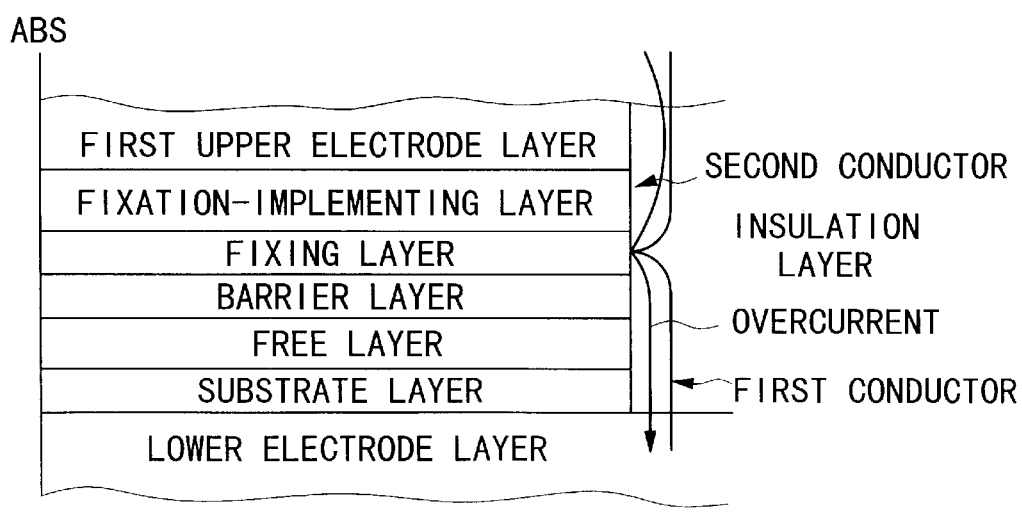
FIG. 16 is a sectional view showing a tenth example of the structure for the magnetoresistive head of FIG. 6 which is equipped with conductors in connection with the barrier layer along the terminal surface.

FIG. 16 is a sectional view showing a tenth example of the structure for the magnetoresistive head of FIG. 6, which is cut using a cutting plane perpendicular to the ABS plane.

This example is characterized by providing first and second conductors which are placed outside of the terminal surface opposite to the ABS plane. Herein, the first conductor is arranged to be electrically in contact with the free layer but is insulated from the fixing layer, while the second conductor is arranged to be electrically in contact with the fixing layer but is insulated from the free layer. In addition, tip end portions of the conductors are connected or attached to the barrier layer such that an interval between the conductors is smaller than an interval of distance between the free layer and fixing layer. Thus, when a potential difference between the free layer and fixing layer exceeds a certain threshold, electric discharge is caused to occur between the tip end portions of the conductors. Normally, the barrier layer is not extended to an area corresponding to the tip end portions of the conductors, so that such an area is irrelevant to an output of the head. So, even if the electric discharge occurs in such an area, the head is not deteriorated in properties so much. Incidentally, the interval of distance between the tip end portions of the conductors is not necessarily varied uniformly in proximity to the terminal surface opposite to the ABS plane. That is, it can be partially reduced at a selected position. It is necessary to establish a condition where electric conductivity being measured between the tip end portions of the conductors is sufficiently smaller than electric conductivity measured between the free layer and fixing layer sandwiching a normal portion of the barrier layer. Therefore, the tip end portions of the conductors can be arranged to be directly in contact with each other as long as the aforementioned condition is satisfied.

The aforementioned examples of the structures shown in FIGS. 4 to 16 are made based on the structure of FIG. 1. Similarly, it is possible to make examples of structures based on the structure of FIG. 2. In the case of the structure of FIG. 2, the head is configured using layers which are sequentially formed and laminated in elevation. Concretely speaking, each of the examples of the heads corresponding to the structure of FIG. 2 is configured by a lower electrode layer, a substrate layer, a fixation-implementing layer, a fixing layer, a barrier layer, a free layer and a first upper electrode layer, which are sequentially arranged vertically from the lower side to the upper side. Herein, the head having the structure of FIG. 2 is basically similar to the head (shown in FIGS. 4 to 16) having the structure of FIG. 1 except that a positional relationship between the fixing layer and free layer sandwiching the barrier layer is turned upside down as compared with the head having the structure of FIG. 1. Therefore, it is possible to similarly apply the concept of this invention to make similar examples using the structure of FIG. 2.

Next, descriptions will be sequentially given with respect to details of the structures of the heads and procedures for manufacturing the heads.

Firstly, a description will be given with respect to materials used for elements constructing the aforementioned structures of the heads. It is possible to propose a variety of materials effectively used for each of the layers, as follows:

As for the base material, it is possible to propose altic, SiC, alumina, altic/alumina, SiC/alumina.

As for the lower shield layer, it is possible to propose NiFe and CoZr. Or, it is possible to propose a single substance, multilayer film or mixture which is made by materials being selected from among CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, iron nitride materials, MnZn ferrite, NiZn ferrite and MgZn ferrite.

As for the lower electrode, it is possible to propose a single substance, multilayer film or mixture which is made by materials being selected from among Au, Ag, Cu, Mo, W, Y, Ti, Zr, Hf, V, Nb, Pt and Ta.

As for the surface control layer, it is possible to propose a single substance, multilayer film or mixture which is made by materials being selected from among Al oxide, Si oxide, aluminum nitride, silicon nitride, diamond-like carbon, Au, Ag, Cu, Mo, W, Y, Ti, Zr, Hf, V, Pt, Nb and Ta.

As for the upper electrode layer, it is possible to propose a single substance, multilayer film or mixture which is made by materials being selected from among Au, Ag, Cu, Mo, W, Y, Pt, Ti, Zr, Hf, V, Nb and Ta.

As for the upper shield layer, it is possible to propose NiFe and CoZr. Or, it is possible to propose a single substance, multilayer film or mixture which is made by materials being selected from among CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, iron nitride materials, MnZn ferrite, NiZn ferrite and MgZn ferrite.

As for the insulation layer, it is possible to propose a single substance, multilayer film or mixture which is made by materials being selected from among Al oxide, Si oxide, aluminum nitride, silicon nitride and diamond-like carbon.

As for the lower gap layer, it is possible to propose a single substance, multilayer film or mixture which is made by materials being selected from among Al oxide, Si oxide, aluminum nitride, silicon nitride and diamondlike carbon.

As for the upper gap layer, it is possible to propose a single substance, multilayer film or mixture which is made by materials being selected from among Al oxide, Si oxide, aluminum nitride, silicon nitride and diamond-like carbon.

As for the upper layer, it is possible to propose a single substance, multilayer film or mixture which is made by materials being selected from among Au, Ag, Cu, Mo, W, Y, Ti, Pt, Zr, Hf, V, Nb and Ta.

As for the longitudinal bias layer, it is possible to propose a single substance, multilayer film or mixture which is made by materials being selected from among CoCrPt, CoCr, CoPt, CoCrTa, FeMn, NiMn, Ni oxide, NiCo oxide, Fe oxide, NiFe oxide, IrMn, PtMn, PtPdMn, ReMn, Co ferrite and Ba ferrite.

As configurations for magnetoresistive (effect) films, it is possible to propose the following configurations of layers:

(1) Base, substrate layer, free layer, first MR enhance layer, barrier layer, second MR enhance layer, fixing layer, fixation-implementing layer and protection layer.

(2) Base, substrate layer, fixation-implementing layer, fixing layer, first MR enhance layer, barrier layer, second MR enhance layer, free layer and protection layer.

(3) Base, substrate layer, first fixation-implementing layer, first fixing layer, first MR enhance layer, barrier layer, second MR enhance layer, free layer, third MR enhance layer, barrier layer, fourth MR enhance layer, second fixing layer, second fixation-implementing layer and protection layer.

(4) Base, substrate layer, fixing layer, first MR enhance layer, barrier layer, second MR enhance layer, free layer and protection layer.

(5) Base, substrate layer, free layer, first MR enhance layer, barrier layer, second MR enhance layer, fixing layer and protection layer.

As for the substrate layer, it is possible to use a single layer film, mixture film or multilayer film which is made by metals, oxides and nitrides. Concretely speaking, it is possible to propose materials being selected from among Ta, Hf, Zr, W, Cr, Ti, Mo, Pt, Ni, Ir, Cu, Ag, Co, Zn, Ru, Rh, Re, Au, Os, Pd, Nb and V. That is, it is possible to form the substrate layer by a single layer film, mixture film or multilayer film which is made by the aforementioned materials or which is made by oxides or nitrides using those materials. In addition, it is possible to employ additional elements being selected from among Ta, Hf, Zr, W, Cr, Ti, Mo, Pt, Ni, Ir, Cu, Ag, Co, Zn, Ru, Rh, Re, Au, Os, Pd, Nb and V. Incidentally, the head does not necessarily use the substrate layer.

As for the free layer, it is possible to propose materials being selected from among NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb and CoZrMoNi alloy as well as amorphous magnetic materials.

As for the barrier layer, it is possible to use oxide, nitride and mixture of oxide and nitride, or it is possible to use a metal/oxide two-layered film, a metal/nitride two-layered film or a metal/mixture (i.e., mixture of oxide and nitride) two-layered film. Herein, it is possible to configure the barrier layer by a laminated film including first and second films. As for the first film, it is possible to propose a single substance, multilayer film or mixture which is made by oxide or nitride of materials being selected from among Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V. As for the second film, it is possible to propose a single substance, multilayer film or mixture which is made by oxide or nitride of materials being selected from among Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V.

As for the first and second MR enhance layers, it is possible to use Co, NiFeCo and FeCo, etc. Or, it is possible to use CoFeB, CoZrMo, CoZrNb, CoZr, CoZrTa, CoHf, CoTa, CoTaHf, CoNbHf, CoZrNb, CoHfPd, CoTaZrNb and CoZrMoNi alloy as well as amorphous magnetic materials. Incidentally, it is possible to exclude the MR enhance layer(s). If the MR enhance layer is excluded, the head is slightly reduced in MR ratio as compared with the head using the MR enhance layer. However, it is possible to reduce a number of steps in manufacture because of exclusion of the MR enhance layer.

As for the fixing layer, it is possible to use materials being selected from among NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb and CoZrMoNi alloy as well as amorphous magnetic materials. It is possible to configure the fixing layer by a laminated film including of first and second films. As for the first film, it is possible to use the aforementioned materials. As the second film, it is possible to use a single substance, alloy or laminated film which is made by base materials being selected from among Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V. Particularly, it is possible to propose eligible configurations of materials such as Co/Ru/Co, CoFe/Ru/CoFe, CoFe/Ru/CoFeNi, Co/Cr/Co, CoFe/Cr/CoFe and CoFeNi/Cr/CoFeNi.

As for the fixation-implementing layer, it is possible to use materials such as FeMn, NiMn, IrMn, RhMn, PtPdMn, ReMn, PtMn, PtCrMn, CrMn, CrAl and TbCo. In addition, it is possible to use Ni oxide, Fe oxide, mixture of Ni oxide and Co oxide and mixture of Ni oxide and Fe oxide as well as a Ni-oxide/Co-oxide two-layered film and a Ni-oxide/Fe-oxide two-layered film. Further, it is possible to use materials such as CoCr, CoCrPt, CoCrTa and PtCo. Preferably, it is possible to propose PtMn or PtMn added with some additional element(s), which is selected from among Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti and Ta.

As for the protection layer, it is possible to use oxide, nitride and mixture of oxide and nitride as well as a metal/oxide two-layered film, a metal/nitride two-layered film and a metal/mixture (i.e., mixture of oxide and nitride) two-layered film. Preferably, it is possible to propose a laminated film including first and second films. As the first film, it is possible to use a single substance, multilayer film or mixture which is made by oxide or nitride of materials being selected from among Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V. As the second film, it is possible to use a single substance, multilayer film or mixture which is made by oxide or nitride of materials being selected from among Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V. Incidentally, the head does not necessarily use the protection film.

Next, descriptions will be given with respect to techniques in processing and manufacturing the heads having the aforementioned structures of FIGS. 1 and 2. Herein, a description will be firstly given with respect to general techniques in manufacturing the heads having the structures of FIGS. 1 and 2 respectively. Then, a description will be given with respect to a brand-new special technique which is characterized by this invention.

Figure 17A:
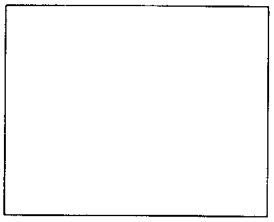
FIG. 17A is a simplified illustration of a base material which is used for manufacture of a head having the structure of FIG. 1 in accordance with a general technique.
Figure 17D:
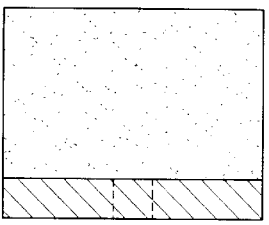
FIG. 17D shows a step for formation of photoresist.
Figure 17G:
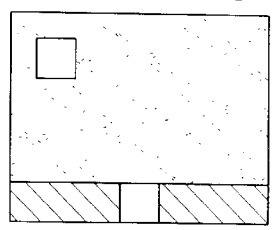
FIG. 17G shows a step for boring on the insulation layer.
Figure 17B:
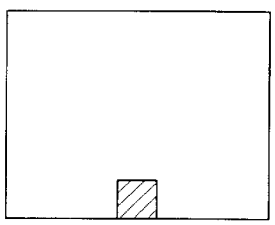
FIG. 17B shows a step for formation of stencil photoresist on the base material.
Figure 17E:
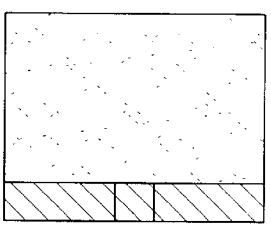
FIG. 17E shows a step for milling being effected up to a barrier layer.
Figure 17H:
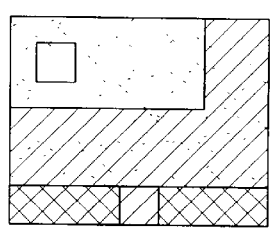
FIG. 17H shows a step for formation of upper electrode and upper shield.
Figure 17C:
FIG. 17C shows a step for formation of longitudinal bias and insulation layer.
Figure 17F:
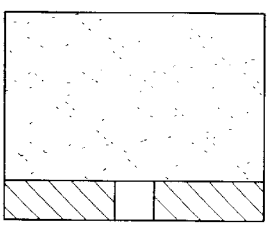
FIG. 17F shows a step for lift-off.

FIGS. 17A to 17H show a general technique in manufacturing the head having the structure of FIG. 1. As shown in FIG. 17A, a lower shield and a lower electrode are sequentially formed on a base material. FIG. 17B shows that stencil photoresist (PR) is formed on the lower electrode. Then, the technique effects formation of longitudinal bias and "lift-off". In addition, the technique effects formation of photoresist (see FIG. 17D) after formation of a ferromagnetic tunnel junction (MTJ) film and an upper electrode. FIG. 17E shows "milling" which is performed up to a barrier layer to enable formation of an insulation layer. Then, the technique effects "lift-off" (see FIG. 17F). In FIG. 17G, the insulation layer is bored so that the lower electrode is being exposed. In FIG. 17H, the technique effects formation of an upper shield.

Figure 18A:
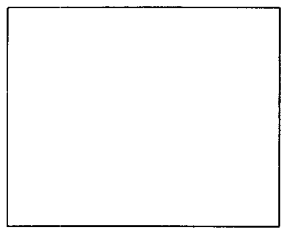
FIG. 18A is a simplified illustration of a base material which is used for manufacture of a head having the structure of FIG. 2 in accordance with a general technique.
Figure 18D:
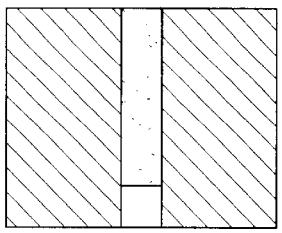
FIG. 18D shows a step for formation of photoresist.
Figure 18G:
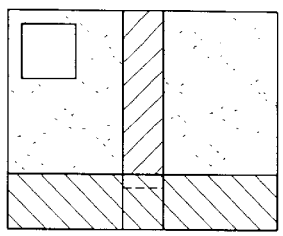
FIG. 18G shows a step for boring on an insulation layer.
Figure 18B:
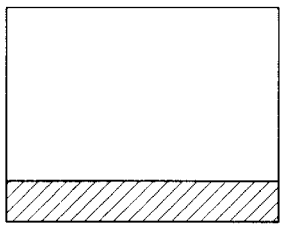
FIG. 18B shows a step for formation of stencil photoresist on the base material.
Figure 18E:
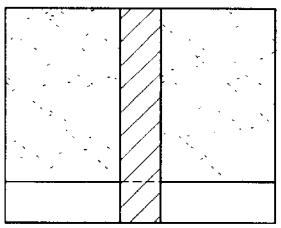
FIG. 18E shows a step for formation of upper electrode.
Figure 18H:
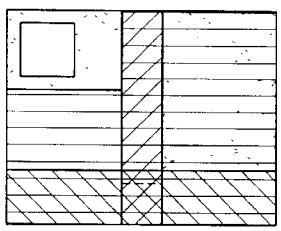
FIG. 18H shows a step for formation of an upper shield.
Figure 18C:
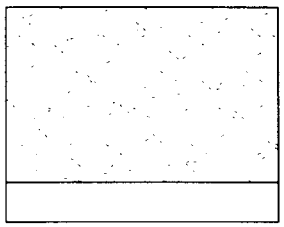
FIG. 18C shows a step for milling being effected up to a barrier layer.
Figure 18F:
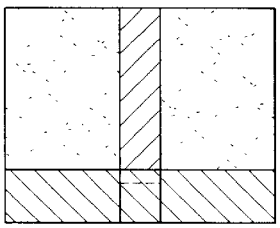
FIG. 18F shows a step for formation of photoresist and longitudinal bias.

FIGS. 18A to 18H show a general technique in manufacturing the head having the structure of FIG. 2. As shown in FIG. 18A, a lower shield, a lower electrode and a ferromagnetic tunnel junction film are sequentially formed on a base material. Then, the technique effects formation of stencil photoresist (see FIG. 18B). FIG. 18C shows that "milling" is performed up to a barrier layer. In addition, the technique effects sequential formation of an insulation layer and a longitudinal bias layer as well as "lift-off". FIG. 18D shows formation of photoresist. The technique effects "milling" up to the insulation layer, then, the photoresist is being removed (see FIGS. 18E, 18F). In FIG. 18G, the insulation layer is bored so that the lower electrode is being exposed. In FIG. 18H, the technique effects formation of an upper shield.

Next, the special technique of this invention will be described in detail by way of an example of a component (e.g., a sample actually manufactured) with reference to FIGS. 19A–19F and FIGS. 20A–20E. Herein, eleven steps are sequentially performed on a sample having the aforementioned structure of FIG. 1, as follows:

1. Step 1

As shown in FIG. 19A, a lower shield is formed on a base material. In addition, the technique effects formation of photoresist and milling or lift-off, so that the base material is shaped in a prescribed pattern. Incidentally, formation of the pattern is performed with respect to an area which is encompassed by a bold line (see FIG. 19B). Then, the technique effects formation of a lower gap and a lower electrode.

2. Step 2

As shown in FIG. 19B, the technique effects formation of photoresist (PR) and milling to shape the lower electrode in a prescribed pattern (corresponding to an area encompassed by a bold line). In addition, milling is effected on a hard film.

3. Step 3

As shown in FIG. 19C, the technique effects formation of lift-off photoresist and a lower electrode thickening layer, which are then subjected to "lift-off".

4. Step 4

As shown in FIG. 19D, the technique effects formation of photoresist in order to shape a longitudinal bias layer in a prescribed pattern, then, the photoresist is subjected to milling to define prescribed shapes (corresponding to areas encompassed by bold lines). The technique removes the photoresist to effect formation of a ferromagnetic tunnel junction (MTJ) film and a first upper electrode layer.

5. Step 5

As shown in FIG. 19E, the technique effects formation of photoresist in order to shape the MTJ film in a prescribed pattern (corresponding to an area encompassed by a bold line). The technique performs milling on the MTJ film up to a barrier layer, then, the photoresist is removed.

6. Step 6

As shown in FIG. 19F, the technique effects formation of photoresist. In addition, the technique performs milling on the barrier layer as well as a free layer, a substrate layer and an insulation layer, then, the photoresist is removed.

7. Step 7

Figure 20A:
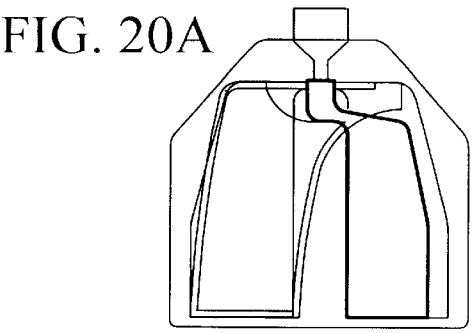
FIG. 20A shows step 7 in manufacture of the head.

As shown in FIG. 20A, the technique effects formation of photoresist for lift-off of a second upper electrode layer (see an area encompassed by a bold line). The technique effects formation of the second upper electrode layer, which is then subjected to lift-off.

8. Step 8

Figure 20D:
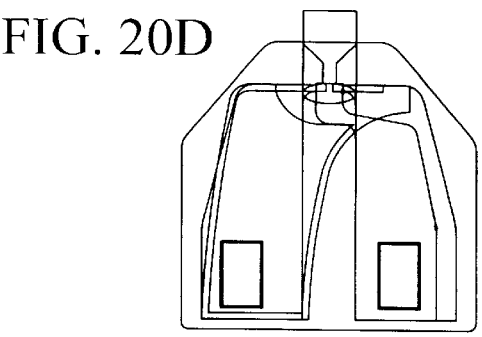
FIG. 20D shows step 10 in manufacture of the head.
Figure 20B:
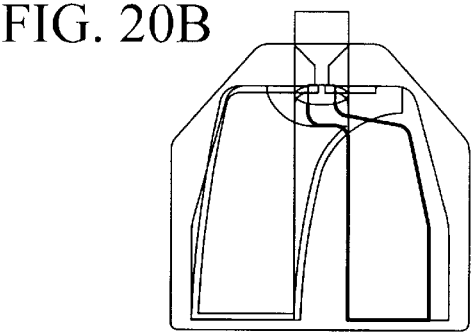
FIG. 20B shows step 8 in manufacture of the head.

As shown in FIG. 20B, the technique effects formation of photoresist for lift-off of an upper electrode thickening layer (see an area encompassed by a bold line). The technique effects formation of the upper electrode thickening layer, which is then subjected to lift-off.

9. Step 9

Figure 20E:
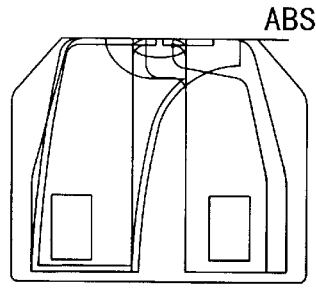
FIG. 20E shows step 11 in manufacture of the head.
Figure 20C:
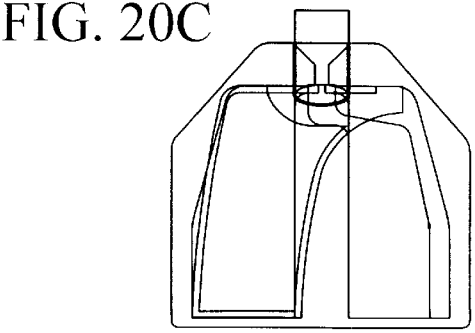
FIG. 20C shows step 9 in manufacture of the head.

As shown in FIG. 20C, the technique effects formation of photoresist for lift-off of an insulation thickening layer. The technique effects formation of the insulation thickening layer, which is then subjected to lift-off.

10. Step 10

As shown in FIG. 20D, the technique effects formation of an upper gap layer as well as formation of photoresist for boring of electrodes (see areas encompassed by bold lines). The technique performs milling so that the electrodes are being exposed, then, the photoresist is removed.

11. Step 11

As shown in FIG. 20E, the technique finally produces a recording head portion. Herein, it is possible to employ any types of configurations for the recording head portion. For this reason, FIG. 20E omits an illustration regarding details of the recording head portion. The base material is cut and processed in an appropriate size. Then, the base material is polished so that an ABS plane is being exposed.

Incidentally, the present specification is not accompanied with illustrations with regard to post-processes of the head being installed in some device. That is, the ABS plane is processed in an appropriate shape so that the head being installed in the device is capable of flying over an medium with an optimal attitude. Then, the head is equipped with a suspension and is subjected to wiring. Thereafter, the manufactured head is shipped to some destination.

The aforementioned steps and procedures are described with respect to the head having the structure of FIG. 1. Of course, the head having the structure of FIG. 2 can be produced by similar steps and procedures.

Next, descriptions will be given with respect to methods for actualization of the aforementioned examples shown in FIGS. 6 to 16.

The examples of FIGS. 6 and 7 are manufactured by a prescribed method, as follows:

Formation of an MTJ film is temporarily stopped when formation of a barrier layer is completed, so that a pre-produced component of the head is extracted and is covered with photoresist except an ABS terminal portion of the barrier layer. Milling is effected on a tip end portion of the barrier layer of the pre-produced component of the head, then, the photoresist is removed. Thereafter, layers following the barrier layer are sequentially formed on it.

Another method for actualization of the example of FIG. 7 is optimization of lapping (or polishing) conditions for lapping that defines the ABS plane after the reproduction head portion and recording head portion are completely formed. Concretely speaking, when lapping is performed in parallel with a plane of the MTJ film, the barrier layer is broken like a nicked edge because the barrier layer has a high hardness but is easily broken. This may cause a condition where only the free layer and fixing layer remain as the MTJ film, which will offer a same structure of the example of FIG. 7. To actualize the structure shown in FIG. 7, it is necessary to plan the lapping conditions in addition to the lapping direction. For example, it is possible to list important parameters for lapping such as types of abrasive materials (or powder), load of weight, relative speeds between the head and abrasive materials, and temperature.

The examples of FIGS. 8 to 10 can be actualized by positively using re-adhesion of elements at the milling. In a patterning step of the MTJ film, when the milling is effected to reach some layer being positioned beneath the barrier layer, atoms being discharged by the milling are collected to form a layer at an end portion of the barrier layer. Such a layer is called a re-adhesive layer. By adequately shaping this layer, it is possible to actualize the structures shown in FIGS. 8 to 10. Generally speaking, the structures of FIGS. 8 to 10 are frequently mixed, wherein it is possible to obtain same effects as well. Optimization of the re-adhesive layer depends on a type of a milling device used for patterning, a milling angle, a milling rate, gas pressure and a target layer which is under the barrier layer and to which the milling is being effected.

The examples of FIGS. 12 and 13 are actualized by a prescribed method, as follows:

Formation of the MTJ film is temporarily stopped when formation of the barrier layer is completed, so that a pre-produced component of the head is extracted and is covered with photoresist except the ABS plane and its opposite terminal portion of the barrier layer. Milling is performed on the terminal portion of the barrier layer, then, the photoresist is removed. Thereafter, prescribed layers following the barrier layer are sequentially formed on the barrier layer.

The examples of FIGS. 14 to 16 can be actualized by positively using re-adhesion of elements at the milling. In the patterning step of the MTJ film, when the milling is effected to reach some layer being positioned beneath the barrier layer, atoms being discharged by the milling are collected to form a layer at a terminal portion of the barrier layer. This layer is called a re-adhesive layer. By adequately shaping such a layer, it is possible to produce the structures of FIGS. 14 to 16. Generally speaking, the structures of FIGS. 14 to 16 are frequently mixed, wherein it is possible to obtain same effects. Optimization of the re-adhesive layer depends on a type of a milling device used for patterning, a milling angle, a milling rate, gas pressure and a target layer which is under the barrier layer and to which the milling is effected.

Next, descriptions will be given with respect to a recording/reproduction head and a recording/reproduction system to which this invention is applied.

Figure 21:
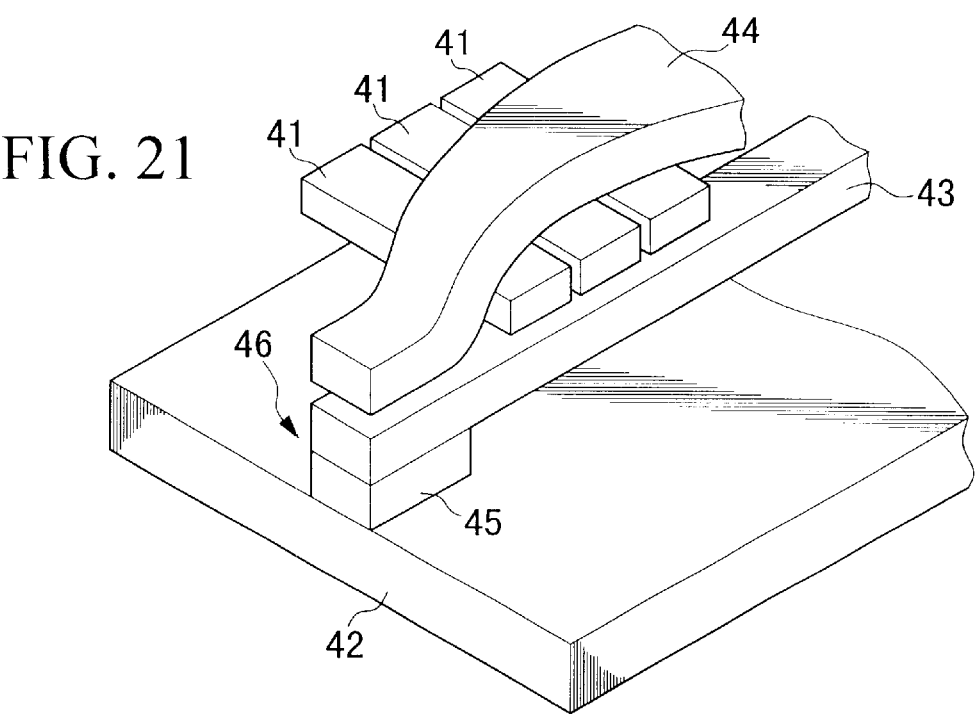
FIG. 21 is an enlarged perspective view showing essential parts of a recording/reproduction head being produced in accordance with this invention.

FIG. 21 shows essential parts of the recording/reproduction head to which this invention is applied. The recording/reproduction head is configured by a reproduction head 45 and a recording head, which is configured by a magnetic pole 43, coils 41 and an upper magnetic pole 44, on a base 42. Herein, it is possible to provide a common film that shares functions of an upper shield film and a lower magnetic film, or it is possible to provide those films independently. Using the recording/reproduction head, it is possible to write signals on recording media, and it is possible to read signals from recording media. In addition, the recording/reproduction head of FIG. 21 is characterized by that a sensing portion of the reproduction head 45 and a magnetic gap of the recording head are formed on a same slider while being overlapped in position. This guarantees positioning of the reproduction head and recording head simultaneously on the same track. The recording/reproduction head is processed in a slider form and is installed in a magnetic recording/reproduction apparatus.

Figure 22:
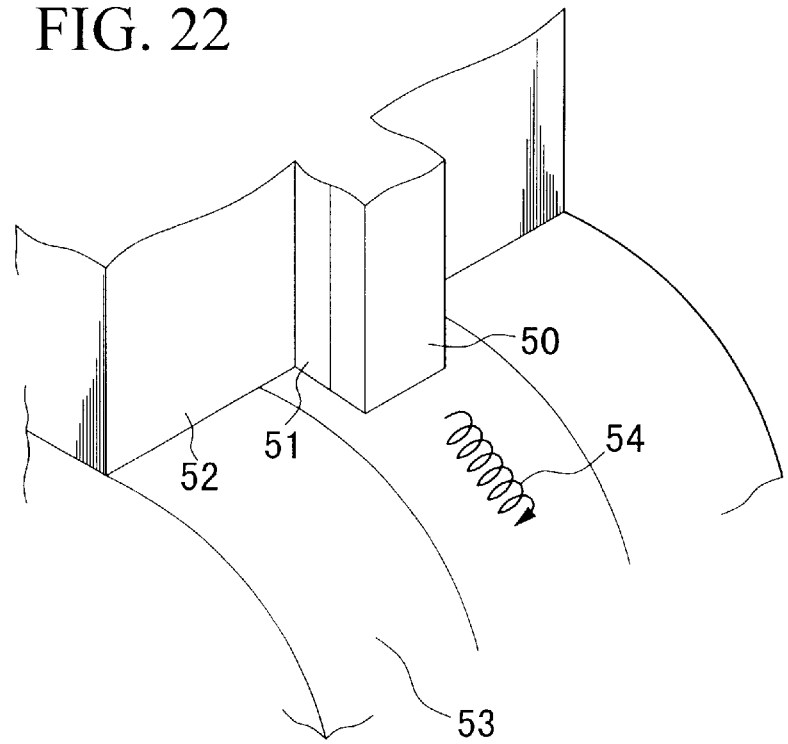
FIG. 22 is an enlarged perspective view showing essential parts of a magnetic recording/reproduction apparatus using a magnetoresistive effect element of this invention.

FIG. 22 shows essential parts of the magnetic recording/reproduction apparatus using the magnetoresistive effect element of this invention. Herein, a reproduction head 51 and a recording head 50 are formed on a substrate 52 that acts as a head slider as well. The head slider is subjected to positioning for reproduction. So, the head slider engages relative motion to face with a recording medium 53 which rotates. That is, the head slider flies over the recording medium 53 with a prescribed height which is under 0.2 $\mu$m, or the head slider is placed in contact with a surface of the recording medium 53. This mechanism allows the head slider to be automatically set at a certain position at which the reproduction head 51 is capable of reading magnetic signals recorded on the recording medium 53 by detecting a leakage magnetic field 54.

Next, descriptions will be given with respect to embodiments of this invention.

1. First Embodiment

We have actually produced a head having the structure of FIG. 3 in accordance with a first embodiment of the invention. Herein, a ferromagnetic tunnel junction (MTJ) film is made by a prescribed configuration, as follows:

/Ta (3 nm)/Pt46Mn54 (15 nm)/Co90Fe10 (2 nm)/Ru (0.8 nm)/
Co90Fe10 (2 nm)/Al oxide (0.7 nm)/Co90Fe10 (0.5 nm)/
Ni82Fe18 (4 nm)/Ta (3 nm)

After completion of formation of the MTJ film, a heat process at 250° C. for five hours is effected while applying a magnetic field of 500 Oe to the "pre-production" head having the MTJ film in a direction perpendicular to a direction of a magnetic field being effected at the formation of the MTJ film. Patterning for the pre-production head is performed completely on the MTJ film up to its lowest layer of Ta. The patterning of the MTJ film is realized by milling that is performed by a general-use milling device in pure Ar gas atmosphere of 0.3 Pa. The milling is performed in a direction perpendicular to a surface of the MTJ film. Due to the milling, re-adhesive substances are formed and attached to terminal surfaces of the MTJ film of the head which is completed in production. We have made analysis on the re-adhesive substances. Analysis results show that the re-adhesive substances come from layers of /Co90Fe10 (0.5 nm)/Ni82Fe18 (4 nm)/Ta (3 nm), which are placed beneath the barrier layer and whose elements fly off to be re-adhered at the milling. However, we have found too much amounts of the re-adhesive substances, by which the free layer and fixing layer are perfectly short-circuited by way of the barrier layer. To optimize the barrier layer in thickness and size, we have conducted adjustment milling on a layer (or layers) of the re-adhesive substances. In general, an MTJ component (i.e., head having the MTJ film) has four terminal surfaces. Herein, two terminal surfaces of the MTJ component in the side of the ABS plane are removed by the lapping step which is effected later, so the adjustment milling is not performed on those terminal surfaces. Thus, two terminal surfaces (or side terminal surfaces) remain being perpendicular to the ABS plane on the MTJ component. Thus, the adjustment milling is effected independently on each of the remaining two terminal surfaces substantially in a direction perpendicular to a film surface of the MTJ component. Actually, the adjustment milling is performed for ten minutes with an angle of inclination of 45° to the terminal surface. Due to the adjustment milling, it is possible to completely remove the re-adhesive substances from the MTJ component. In short, it is an important factor in application of this invention to control the layers of the re-adhesive substances being formed on the specific terminal surfaces which are opposite to the ABS plane. For this reason, the adjustment milling is performed substantially in a direction perpendicular to the film surface as well as in an opposite side of the ABS plane with a certain angle of inclination of 45°, wherein a milling time is adequately changed. Incidentally, the adjustment milling is performed by the general-use milling device in pure Ar gas atmosphere of 0.3 Pa.

The head of the first embodiment is configured by the following materials and elements, wherein compositions are expressed using "at %".

A base is formed as a laminated layer in which alumina of 10 $\mu$m is formed on altic having a thickness of 2 mm.

In a reproduction head portion, a lower shield layer is made by Co89Zr4Ta4Cr3 (1 $\mu$m), a lower gap layer is made by alumina (20 nm), and a lower gap thickening layer is made by alumina (40 nm). In addition, a lower electrode layer is made by Ta (1.5 nm)/Pt (80 nm)/Ta (3 nm), a lower electrode thickening layer is made by Ta (1.5 nm)/Au (40 nm)/Ta (3 nm), an insulation layer is made by alumina (40 nm), and a longitudinal bias layer is made by Cr (10 nm)/Co74.5 Cr10.5Pt15 (36 nm). Further, a first upper electrode layer is made by Ta (20 nm), a second upper electrode layer is made by Ta (1.5 nm)/Au (40 nm)/Ta (3 nm), and an upper electrode thickening layer is made by Ta (1.5 nm)/Au (40 nm)/Ta (3 nm). Furthermore, an upper gap layer is made by alumina (40 nm), an upper gap thickening layer is made by alumina (40 nm), and an upper shield layer is made as a common pole that acts as a recording head lower pole as well. Incidentally, the head of the first embodiment does not use a surface control layer and an upper layer.

In a recording head portion, a substrate of the common pole is made by Ni82Fe18 (90 nm), the common pole is made by Ni82Fe18 (2.5 $\mu$)/Co65Ni12Fe23 (0.5 $\mu$m), and a recording gap layer is made by alumina (0.3 $\mu$m). In addition, a gap thickening layer is made by alumina (0.7 $\mu$m), a coil substrate is made by Cr (30 nm)/Cu (150 nm), and a coil (or coils) is made by Cu (4.5 $\mu$m). Further, an upper pole substrate is made by Ti (10 nm)/Co65Ni12Fe23 (0.1$\mu$m), an upper pole is made by Co65Ni12Fe23 (0.5 $\mu$m)/Ni82Fe18 (3.5 $\mu$m), a terminal substrate is made by Cr (30 nm)/Cu (150 nm), and a terminal (or terminals) is made by Cu (50 $\mu$m). Furthermore, an overcoat is made by alumina (52 $\mu$m), a metal terminal substrate is made by Ti (10 nm)/Ni82Fe18 (0.1 $\mu$m), and a metal terminal (or metal terminals) is made by Au (3 $\mu$m).

The head of the first embodiment is produced by prescribed steps, as follows:

(A) Steps for Producing the Reproduction Head Portion
1. Base (or substrate) cleaning.
2. Lower shield formation and annealing.
3. Alignment mark formation (i.e., photoresist formation→patterning→photoresist removal).
4. Lower shield patterning (i.e., photoresist formation→taper process→photoresist removal).
5. Lower gap formation (i.e., photoresist formation→film formation→lift-off).
6. Lower gap thickening (i.e., photoresist formation→film formation→lift-off).
7. Lower electrode formation (i.e., photoresist formation film→formation→lift-off).
8. Lower electrode thickening formation (i.e., photoresist formation→film formation→lift-off).
9. Longitudinal bias film formation (i.e., photoresist formation→film formation→lift-off).
10. Formation of the MTJ component and first upper electrode (i.e., MTJ film formation→first upper electrode formation→photoresist formation→milling being effected up to a lower layer of the MTJ film simultaneously with formation of re-adhesive substances on terminal surfaces of the MTJ component).
11. Adjustment milling on the re-adhesive substances on the terminal surfaces of the MTJ component.
12. Adjustment milling on the re-adhesive substances on specific terminal surfaces of the MTJ component opposite to the ABS plane.
13. Insulation layer formation (i.e., film formation→lift-off).
14. Boring of the insulation layer and barrier layer (i.e., photoresist formation→milling→photoresist removal).
15. Second upper electrode formation (i.e., photoresist formationΔfilm formation→lift-off).
16. Pole height monitor formation (i.e., photoresist formation→film formation→lift-off).
17. Upper electrode thickening (i.e., photoresist formation→film formation→lift-off).
18. Upper gap formation (i.e., photoresist formation→film formation→lift-off).
19. Upper gap thickening formation (i.e., photoresist formation→film formation→lift-off).

In the above, we have made four types of the reproduction head portions, wherein a first type is made without performing the adjustment milling on the re-adhesive substances, a second type is made by performing the adjustment milling for two minutes, a third type is made by performing the adjustment milling for five minutes, and a fourth type is made by performing the adjustment milling for ten minutes. Naturally, the first type has a greatest amount of re-adhesive substances because it does not perform the adjustment milling. The amounts of the re-adhesive substances are reduced in response to increase of the milling time. The fourth type does not substantially leave the re-adhesive substances after the adjustment milling for ten minutes.

(B) Steps for Producing the Recording Head Portion
1. Common pole formation→(i.e., second substrate formation→frame photoresist formation→common pole plating→cover photoresist formation→chemical etching→substrate removal).
2. Pole height bore-filling resist.
3. Gap formation.
4. Gap thickening formation (i.e., photoresist formation→film formation→lift-off).
5. Formation of PW (i.e., a pole used for magnetically interconnecting an upper pole with a common pole) (i.e., photoresist formation→milling→photoresist removal).
6. Formation of coil forming SC1 resist (i.e., a first resist used for securing insulation of a coil).
7. Coil formation (i.e., substrate formation→photoresist formation→coil plating→chemical etching→substrate removal).
8. Formation of SC2 resist (i.e., a second resist used for securing insulation of a coil).
9. Gap adjustment milling.
10. Upper pole formation (i.e., substrate formation→frame resist formation→upper pole plating→plating annealing→substrate removal→cover photoresist formation→chemical etching→substrate removal).
11. Terminal formation (i.e., substrate formation→photoresist formation→terminal plating→chemical etching→substrate removal).
12. Overcoat formation.
13. Terminal lap.
14. Metal terminal plating (i.e., substrate formation→photoresist formation→metal terminal plating→substrate removal).

(C) Steps of Post-processing
1. Row cutting.
2. ABS plane process lap.
3. DLC formation→on ABS plane.
4. Slider process.
5. Installation to suspension.

For trial, the aforementioned head is used to record and reproduce data on CoCrTa media. Herein, recording and reproduction are made under prescribed conditions where a width of a write track is 3 $\mu$m, a write gap is 0.2 $\mu$m, and a width of a read track is 2 $\mu$m. In production of the recording head portion (or write head portion), a photoresist hardening process is effected at a prescribed temperature of 250° C. for two hours. Normally, a magnetization direction of the fixing layer and fixation-implementing layer should coincide with a height direction of the magnetoresistive effect element. Due to the photoresist hardening process, such a magnetization direction rotates so that the magnetoresistive effect element does not operate normally. To cope with such a drawback, after production of the reproduction head portion and recording head portion is completed, the head is subjected to a magnetized heat process, which is effected at a prescribed temperature of 200° C. under a magnetic field of 500 Oe for one hour. Due to the magnetized heat process, rotation may be caused to occur on an axis of easy magnetization of the free layer toward a magnetization direction. However, such rotation is not observed from a magnetization curve. We have made four types of heads by effecting the aforementioned processes. Herein, a first type is made without performing adjustment milling on re-adhesive substances, a second type is made by performing the adjustment milling for two minutes, a third type is made by performing the adjustment milling for five minutes, and a fourth type is made by performing the adjustment milling for ten minutes. Incidentally, we have actually produced ten (pre-production) heads with respect to each type.

Coercive force of the media is 5.0 kOe, while MrT is 0.35 memu/$cm^2$. Then, reproduction outputs are measured using the pre-production heads. Now, measurement results will be described in reproduction outputs of the ten heads with respect to each of the four types. In the case of the first type of ten heads which are made without performing the adjustment milling, only three out of ten heads produce high outputs which are equal to or greater than 3 mV. This is because too much amounts of re-adhesive substances are attached to terminal surfaces of the MTJ component opposite to the ABS plane. In other words, there is a high probability in that the free layer and fixing layer are perfectly short-circuited due to the re-adhesive substances. In the case of the second and third types, eight out of ten heads produce high outputs which are equal to or greater than 3 mV. This is because amounts of re-adhesive substances are optimized by the adjustment milling. That is, the re-adhesive substances are shaped as shown in FIGS. 14, 15 and 16, so that the free layer and fixing layer are not short-circuited. In addition, even if excessive voltage is applied between the free layer and fixing layer during the aforementioned process, electric charges smoothly and speedily move by way of the re-adhesive substances which function to protect the head. In the case of the fourth type, however, only three out of ten heads produce high outputs which are equal to or greater than 3 mV That is, the fourth type is reduced in yield. Since almost all of the re-adhesive substances are perfectly removed by the adjustment milling that is effected for ten minutes, there is substantially no probability in that the free layer and fixing layer are perfectly short-circuited. However, the fourth type cannot use the re-adhesive substances that function to protect the head when excessive voltage is applied between the free layer and fixing layer. That is, due to lack of the re-adhesive substances, electric discharge is caused to occur between the free layer and fixing layer during the manufacturing process, which increases a probability in that the barrier layer is being destructed.

We have actually measured reproduction outputs with respect to the four types of the heads respectively. Measurements results will be described below.

In the case of the first type of the ten heads which are produced without performing the adjustment milling, reproduction outputs are measured as follows:

Sample No. 1: 0.2 mV
Sample No. 2: 0.4 mV
Sample No. 3: 0.5 mV
Sample No. 4: 3.2 mV
Sample No. 5: 3.2 mV
Sample No. 6: 3.1 mV
Sample No. 7: 0.8 mV
Sample No. 8: 0.3 mV
Sample No. 9: 0.4 mV
Sample No. 10: 0.3 mV In the case of the second type of the ten heads each of which is produced by performing the adjustment milling for two minutes, reproduction outputs are measured as follows:

Sample No. 1: 3.2 mV
Sample No. 2: 3.0 mV
Sample No. 3: 0.8 mV
Sample No. 4: 3.2 mV
Sample No. 5: 3.2 mV
Sample No. 6: 3.1 mV
Sample No. 7: 3.2 mV
Sample No. 8: 3.2 mV
Sample No. 9: 0 mV
Sample No. 10: 3.1 mV In the case of the third type of the ten heads each of which is produced by performing the adjustment milling for five minutes, reproduction outputs are measured as follows:

Sample No. 1: 3.1 mV
Sample No. 2: 0 mV
Sample No. 3: 3.1 mV
Sample No. 4: 3.2 mV
Sample No. 5: 3.0 mV
Sample No. 6: 3.1 mV
Sample No. 7: 3.2 mV
Sample No. 8: 1.2 mV
Sample No. 9: 3.1 mV
Sample No. 10: 0 mV In the case of the fourth type of the ten heads each of which is produced by performing the adjustment milling for ten minutes, reproduction outputs are measured as follows:

Sample No. 1: 3.2 mV
Sample No. 2: 0 mV
Sample No. 3: 0 mV
Sample No. 4: 3.2 mV
Sample No. 5: 0.2 mV
Sample No. 6: 3.0 mV
Sample No. 7: 0.1 mV
Sample No. 8: 0.3 mV
Sample No. 9: 0 mV
Sample No. 10: 0.2 mV 2. Second Embodiment Next, we have produced heads in accordance with a second embodiment of this invention. The heads of the second embodiment are made substantially by the same steps and processes of the first embodiment, however, some processes are partially changed. One major difference by which the second embodiment differs from the first embodiment is oxidation that is effected using oxygen plasma to control amounts of re-adhesive substances being attached to terminal surfaces of the MTJ component opposite to the ABS plane. As similar to the first embodiment, the second embodiment performs adjustment milling to remove layers of re-adhesive substances on the terminal surfaces of the MTJ component in proximity to the ABS plane. However, the second embodiment does not perform adjustment milling on the terminal surfaces of the MTJ component being opposite to the ABS plane. Herein, the second embodiment uses prescribed plasma oxidation conditions, as follows:

RF power of 200 W is applied to Ar gas of 0.3 Pa and 02 atmosphere of 01.0 Pa to produce plasma. The terminal portions of the MTJ component are brought into contact with the plasma. Herein, oxidation times are adequately changed as zero, five, ten and twenty minutes.

The second embodiment sequentially performs specific processes, as follows:
1. Formation of MTJ component and first upper electrode (i.e., MTJ film formation→first upper electrode formation→photoresist formation→milling being effected up to a lower layer of the MTJ film simultaneously with formation of re-adhesive substances on terminal surfaces of the MTJ component).
2. Adjustment milling being effected on the re-adhesive substances on the terminal surfaces of the MTJ component.
3. Plasma oxidation being effected to control amounts of re-adhesive substances on the terminal surfaces of the MTJ component opposite to the ABS plane.
4. Insulation layer formation (i.e., film formation→lift-off).

In accordance with the aforementioned processes, we have produced four types of heads by changing plasma oxidation times, wherein a first type is made without performing plasma oxidation, a second type is made by performing plasma oxidation for five minutes, a third type is made by performing plasma oxidation for ten minutes, and a fourth type is made by performing plasma oxidation for twenty minutes. Herein, we have made ten (pre-production) heads with respect to each of four types, by which reproduction signals are being measured. Now, measurement results will be described with respect to each of the four types. In the case of the first type, only three out of ten heads produce high outputs which are equal to or greater than 3 mV. This is because too much amounts of re-adhesive substances are attached to the terminal surfaces of the MTJ component opposite to the ABS plane. That is, there is a high probability in that the free layer and fixing layer are perfectly short-circuited by way of the re-adhesive substances. In the case of the second and third types whose plasma oxidation times are five and ten minutes respectively, eight out of ten heads produce high outputs that are equal to or greater than 3 mV This is because the re-adhesive substances are adequately subjected to plasma oxidation, wherein some amounts of re-adhesive substances remain without being oxidized. Herein, remaining re-adhesive substances which are not oxidized are optimized in amount so that they are shaped to substantially realizes the aforementioned structures of FIGS. 14, 15 and 16, by which the free layer and fixing layer are not short-circuited. So, even if excessive voltage is applied between the free layer and fixing layer during the aforementioned process, electric charges smoothly and speedily move by way of layers of the remaining re-adhesive substances, which function to protect the head. In the case of the fourth type whose plasma oxidation time is twenty minutes, however, only four out of ten heads produce high outputs that are equal to or greater than 3 mV. That is, the fourth type is reduced in yield. Since the fourth type effects the plasma oxidation for twenty minutes to perfectly remove the re-adhesive substances, there is substantially no probability in that the free layer and fixing layer are perfectly short-circuited. However, the fourth type cannot use the re-adhesive substances that function to protect the head when excessive voltage is applied between the free layer and fixing layer. Thus, electric discharge may be caused to occur between the free layer and fixing layer during the manufacturing process, which increases a probability in that the barrier layer is being destructed.

We have actually measured reproduction outputs with respect to the aforementioned four types of the heads respectively. Measurement results will be described below.

In the case of the first type of the ten heads which are produced without performing the plasma oxidation, reproduction outputs are measured as follows:
Sample No. 1: 1.4 mV
Sample No. 2: 0.2 mV
Sample No. 3: 1.1 mV
Sample No. 4: 1.3 mV
Sample No. 5: 3.1 mV
Sample No. 6: 3.2 mV
Sample No. 7: 0.4 mV
Sample No. 8: 0.7 mV
Sample No. 9: 3.1 mV
Sample No. 10: 0.7 mV In the case of the second type of the ten heads each of which is produced by performing the plasma oxidation for five minutes, reproduction outputs are measured as follows:
Sample No. 1: 3.2 mV
Sample No. 2: 0.7 mV
Sample No. 3: 3.1 mV
Sample No. 4: 3.1 mV
Sample No. 5: 3.2 mV
Sample No. 6: 3.2 mV
Sample No. 7: 3.2 mV
Sample No. 8: 0.1 mV
Sample No. 9: 3.2 mV
Sample No. 10: 3.1 mV In the case of the third type of the ten heads each of which is produced by performing the plasma oxidation for ten minutes, reproduction outputs are measured as follows:
Sample No. 1: 3.2 mV
Sample No. 2: 3.1 mV
Sample No. 3: 0 mV
Sample No. 4: 3.0 mV
Sample No. 5: 3.1 mV
Sample No. 6: 3.2 mV
Sample No. 7: 3.2 mV
Sample No. 8: 3.1 mV
Sample No. 9: 0.2 mV
Sample No. 10: 0 mV In the case of the fourth type of the ten heads each of which is produced by performing the plasma oxidation for twenty minutes, reproduction outputs are measured as follows:
Sample No. 1: 3.1 mV
Sample No. 2: 0.7 mV
Sample No. 3: 0.4 mV
Sample No. 4: 3.1 mV
Sample No. 5: 3.2 mV
Sample No. 6: 3.1 mV
Sample No. 7: 0.7 mV
Sample No. 8: 0.6 mV
Sample No. 9: 0.8 mV
Sample No. 10: 0.2 mV Next, a description will be given with respect to a magnetic disk device, which is produced using the aforementioned concept and structure of this invention. The magnetic disk device installs three magnetic disks on a base. In addition, the magnetic disk device stores a head drive circuit, a signal processing circuit and an I/O interface in connection with a back surface of the base. Further, the magnetic disk device is connected with an external device or system by way of a 32-bit bus line. In total, Six heads are arranged on both sides of the magnetic disk. In order to drive the heads, the magnetic disk device installs a rotary actuator and its driveand-control circuit as well as a motor directly coupled with a spindle for rotation of the disks. Each of the disks has prescribed dimensions such as diameter of 46 mm, in which a data area occupies a range between 10 mm and 40 mm in diameter. The magnetic disk device employs the so-called embedded servo system, which does not require a servo area to enable high-density recording of data. Incidentally, the present magnetic disk device can be directly connected with a small computer as its external storage device. In addition, the I/O interface installs a cache memory to respond to a bus line whose data transfer speed ranges from five to twenty megabytes per second. It is possible to use an external controller by which multiple sets of the magnetic disk devices are connected together to form a magnetic disk system of large storage capacity.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A magnetoresistive head whose operation depends on a magnetoresistive effect, comprising:
    a lower electrode layer;
    a ferromagnetic tunnel junction film having an air bearing surface, which includes a set of a free layer, a barrier layer and a fixing layer being sequentially formed and laminated on the lower electrode layer; and
    an upper electrode layer, which is formed on the ferromagnetic tunnel junction film,
    wherein resistance being measured at a terminal portion of the ferromagnetic tunnel junction film extending depthwise away from said air bearing surface is smaller than resistance measured at a center portion of the ferromagnetic tunnel junction film.

2. A magnetoresistive head according to claim 1 wherein resistance being measured between the free layer and the fixing layer at a first terminal portion of the ferromagnetic tunnel junction film which is placed in proximity to an ABS plane or at a second terminal portion of the ferromagnetic tunnel junction film which is placed opposite to the ABS plane is smaller than the resistance measured at the center portion of the ferromagnetic tunnel junction film.

3. A magnetoresistive head according to claim 1, wherein the barrier layer is reduced in thickness at the terminal portion of the ferromagnetic tunnel junction film as compared with the center portion of the ferromagnetic tunnel junction film.

4. A magnetoresistive head according to claim 1, wherein an interval of distance between the free layer and the fixing layer at the terminal portion of the ferromagnetic tunnel junction film is smaller than an interval of distance between the free layer and the fixing layer at the center portion of the ferromagnetic tunnel junction film.

5. The magnetoresistive head of claim 1, wherein the terminal portion is adjacent an air bearing surface.

6. The magnetoresistive head of claim 5, wherein the barrier layer goes from thinner to thicker in a direction moving away from the air bearing surface.

7. The magnetoresistive head of claim 1, wherein the terminal portion is in an area opposite from an air bearing surface.

8. The magnetoresistive head of claim 7, wherein the barrier layer goes from thinner to thicker in a direction moving toward the air bearing surface.

9. A magnetoresistive head whose operation depends on a magnetoresistive effect, comprising:
    a lower electrode layer;
    a ferromagnetic tunnel junction film having an air bearing surface, which includes a set of a free layer, a barrier layer and a fixing layer being sequentially formed and laminated on the lower electrode layer; and
    an upper electrode layer, which is formed on the ferromagnetic tunnel junction film,
    wherein discharge critical voltage between the free layer and the fixing layer at a terminal portion of the ferromagnetic tunnel junction film extending depthwise away from said air bearing surface is smaller than discharge critical voltage at a center portion of the ferromagnetic tunnel junction film.

10. A magnetoresistive head according to claim 9 wherein discharge critical voltage between the free layer and the fixing layer at a first terminal portion of the ferromagnetic tunnel junction film which is placed in proximity to an ABS plane or at a second terminal portion of the ferromagnetic tunnel junction film which is placed opposite to the ABS plane is smaller than discharge critical voltage at the center portion of the ferromagnetic tunnel junction film.

11. The magnetoresistive head of claim 9, wherein the terminal portion is adjacent an air bearing surface.

12. The magnetoresistive head of claim 11, wherein the barrier layer goes from thinner to thicker in a direction moving away from the air bearing surface.

13. The magnetoresistive head of claim 11, wherein the barrier layer goes from thinner to thicker in a direction moving toward the air bearing surface.

14. The magnetoresistive head of claim 9, wherein the terminal portion is in an area opposite from an air bearing surface.

15. A magnetic resistance detection system comprising:
    a magnetoresistive sensor whose operation depends on a magnetoresistive effect and which is configured using a ferromagnetic tunnel function film having an air bearing surface including a set of a free layer, a barrier layer and a fixing layer, wherein a terminal portion of the ferromagnetic tunnel junction film extending depthwise away from said air bearing surface is increased in electric conductance as compared with a center portion of the ferromagnetic tunnel junction film;
    a current source for supplying the magnetoresistive sensor with an electric current; and
    a resistance detector for detecting variations of resistance of the magnetoresistive sensor to indicate a function of a magnetic field that occurs on a magnetic medium.

16. The magnetoresistive head of claim 15, wherein the terminal portion is adjacent an air bearing surface.

17. The magnetoresistive head of claim 16, wherein the barrier layer goes from thinner to thicker in a direction moving away from the air bearing surface.

18. The magnetoresistive head of claim 15, wherein the terminal portion is in an area opposite from an air bearing surface.

19. The magnetoresistive head of claim 18, wherein the barrier layer goes from thinner to thicker in a direction moving toward the air bearing surface.

20. A magnetic storage system comprising:
- a magnetic storage medium having a plurality of tracks for recording data;
- a magnetic recorder for recording the data on the magnetic storage medium;
- a magnetic resistance detector for detecting variations of resistance of a magnetoresistive sensor to indicate a function of a magnetic field that occurs on the magnetic storage medium, wherein the magnetoresistive sensor whose operation depends on a magnetoresistive effect is configured using a ferromagnetic tunnel function film having an air bearing surface including a set of a free layer, a barrier layer and a fixing layer, and wherein a terminal portion of the ferromagnetic tunnel junction film extending depthwise away from said air bearing surface is increased in electric conductance as compared with a center portion of the ferromagnetic tunnel junction film; and
- an actuator coupled with the magnetic recorder and the magnetic resistance detector, by which the data are recorded or reproduced on a selected track of the magnetic storage medium.

21. The magnetoresistive head of claim 20, wherein the terminal portion is adjacent an air bearing surface.

22. The magnetoresistive head of claim 21, wherein the barrier layer goes from thinner to thicker in a direction moving away from the air bearing surface.

23. The magnetoresistive head of claim 20, wherein the terminal portion is in an area opposite from an air bearing surface.

24. The magnetoresistive head of claim 23, wherein the barrier layer goes from thinner to thicker in a direction moving toward the air bearing surface.

25. A magnetoresistive head whose operation depends on a magnetoresistive effect, comprising:
- a lower electrode layer;
- a ferromagnetic tunnel junction film having an air bearing surface, which includes a set of a free layer, a barrier layer and a fixing layer being sequentially formed and laminated on the lower electrode layer;
- longitudinal bias layers which are arranged on both sides of the ferromagnetic tunnel junction film respectively;
- insulation layers which are arranged on both sides of the ferromagnetic tunnel junction film respectively; and
- an upper electrode layer which is formed on the ferromagnetic tunnel junction film,
- wherein a terminal portion of the ferromagnetic tunnel junction film extending depthwise away from said air bearing surface is increased in electric conductivity as compared with a center portion of the ferromagnetic tunnel junction film, thus providing a bypass to allow overcurrent release between the free layer and the fixing layer.

26. A magnetoresistive head according to claim 25 wherein the barrier layer is reduced in thickness at the terminal portion of the ferromagnetic tunnel junction film as compared with the center portion of the ferromagnetic tunnel junction film.

27. A magnetoresistive head according to claim 25 wherein the barrier layer has a defect at the terminal portion of the ferromagnetic tunnel junction film.

28. A magnetoresistive head according to claim 25 further comprising a conductor which is arranged in connection with the barrier layer at the terminal portion of the ferromagnetic tunnel junction film.

29. A magnetoresistive head according to claim 25 further comprising a layer of re-adhesive substance which is produced by milling for patterning of the ferromagnetic tunnel junction film and is deposited on the terminal portion of the ferromagnetic tunnel junction film.

30. The magnetoresistive head of claim 25, wherein the terminal portion is adjacent an air bearing surface.

31. The magnetoresistive head of claim 30, wherein the barrier layer goes from thinner to thicker in a direction moving away from the air bearing surface.

32. The magnetoresistive head of claim 25, wherein the terminal portion is in an area opposite from an air bearing surface.

33. The magnetoresistive head of claim 32, wherein the barrier layer goes from thinner to thicker in a direction moving toward the air bearing surface.

* * * * *